US012148258B2

(12) United States Patent
Imanuel

(10) Patent No.: US 12,148,258 B2
(45) Date of Patent: Nov. 19, 2024

(54) MULTIFAMILY ELECTRONIC LOCK CREDENTIAL MANAGEMENT

(71) Applicant: ASSA ABLOY Americas Residential Inc., New Haven, CT (US)

(72) Inventor: Derek Imanuel, Irvine, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 91 days.

(21) Appl. No.: 17/842,465

(22) Filed: Jun. 16, 2022

(65) Prior Publication Data

US 2022/0406113 A1 Dec. 22, 2022

Related U.S. Application Data

(60) Provisional application No. 63/211,342, filed on Jun. 16, 2021.

(51) Int. Cl.

| | |
|---|---|
| ***G07C 9/27*** | (2020.01) |
| ***G07C 9/00*** | (2020.01) |
| ***G07C 9/29*** | (2020.01) |

(52) U.S. Cl.

CPC ........... *G07C 9/27* (2020.01); *G07C 9/00309* (2013.01); *G07C 9/29* (2020.01); *G07C 2009/00333* (2013.01); *G07C 2009/00412* (2013.01); *G07C 2009/00555* (2013.01)

(58) Field of Classification Search

CPC ........ G07C 9/27; G07C 9/00309; G07C 9/29; G07C 2009/0033; G07C 2009/00412

See application file for complete search history.

(56) References Cited

U.S. PATENT DOCUMENTS

| | | | | |
|---|---|---|---|---|
| 9,424,700 | B2 | 8/2016 | Lovett et al. | |
| 11,238,683 | B1 * | 2/2022 | Mars | H04W 12/084 |
| 11,715,339 | B1 * | 8/2023 | Hilmas | G07C 9/215 340/5.61 |
| 2012/0280783 | A1 * | 11/2012 | Gerhardt | H04L 63/08 340/5.6 |
| 2013/0335193 | A1 * | 12/2013 | Hanson | G07C 9/00174 340/5.61 |
| 2014/0051407 | A1 * | 2/2014 | Ahearn | G07C 9/00174 455/414.1 |
| 2015/0235497 | A1 * | 8/2015 | Voss | G07C 9/00309 340/5.61 |
| 2016/0180618 | A1 | 6/2016 | Ho et al. | |

(Continued)

OTHER PUBLICATIONS

International Search Report and Written Opinion for PCT/US2022/033850, mailed Oct. 11, 2022.

*Primary Examiner* — Nabil H Syed
(74) *Attorney, Agent, or Firm* — Merchant & Gould P.C.

(57) ABSTRACT

An electronic lock access management system includes an electronic lock and a server system. In some embodiments, the server system includes a memory storing a database including a plurality of user accounts, each user account being associated with a set of privileges and one or more properties, each property being associated with one or more locks, each of the locks being associated with one or more access codes that are specific to each user. In some embodiments, the electronic lock stores, in the lock memory, an encrypted copy of an access code list received from the server system based on a set of access codes that are associated with the electronic lock in the database.

19 Claims, 18 Drawing Sheets

(56) References Cited

U.S. PATENT DOCUMENTS

| | | | | |
|---|---|---|---|---|
| 2016/0284148 | A1 | 9/2016 | Almomani | |
| 2016/0292943 | A1* | 10/2016 | Ranchod | E05B 47/0603 |
| 2017/0053468 | A1 | 2/2017 | Johnson | |
| 2019/0172285 | A1 | 6/2019 | Jin | |
| 2019/0327098 | A1 | 10/2019 | Hart | |
| 2022/0051498 | A1 | 2/2022 | Hart | |
| 2022/0335764 | A1 | 10/2022 | Immanuel | |

* cited by examiner

MULTIFAMILY ELECTRONIC LOCK CREDENTIAL MANAGEMENT

CROSS-REFERENCE TO RELATED APPLICATIONS

The present application claims priority to U.S. Provisional Patent Application No. 63/211,342, filed on Jun. 16, 2021, the disclosure of which is hereby incorporated by reference in its entirety.

TECHNICAL FIELD

This invention relates to the field of electronic locks. More particularly, this invention relates to systems and methods of managing electronic lock credentials in a multifamily environment.

BACKGROUND

Electronic locks have gained increasing acceptance and widespread use in residential and commercial markets due to the many benefits they provide. One such benefit is the ability to lock or unlock a door with the use of a mobile device, such as a smartphone or tablet. This is not only useful for the owner or tenant of the premises where the electronic lock is installed, but can also be useful for conveniently enabling or disabling users in a multiuser scenario, such as where a building represents a multifamily structure (e.g., a condominium or other multi-unit building). In such instances, there may be long-term users who may need to have access rights programmed into an electronic lock, but who do not have administrative rights to affect accounts of other users of the electronic lock. Still further, each of the tenant users may have one or more guests that they would like to grant access.

While existing electronic locks allow multiple users to be granted access, there is no adequate method by which users are conveniently managed where multiple users may require access to multiple locks, such that authentication credentials for a given user can be managed across an overall environment.

Accordingly, a secure system and method for enabling management of multiple users having different levels of access rights across multiple locks is needed.

SUMMARY

The present disclosure relates generally to systems and methods for management of electronic locks that may be used in a multifamily environment, typically a multi-unit building in which different users have access to overlapping, but different, subsets of electronic locks in a given location or plurality of locations.

In a first aspect, an electronic lock includes a latch assembly including a bolt movable between a locked position and an unlocked position, and a motor configured to receive actuation commands causing the motor to move the bolt from the locked position to the unlocked position or from the unlocked position to the locked position. The electronic lock includes a wireless circuit configured to communicate wirelessly with an application installed on a mobile device, at least one processor, and a memory communicatively connected to the processor. The memory stores instructions which, when executed, cause the electronic lock to: establish a wireless communication connection with a mobile device executing a mobile application, the mobile device being associated with a user; receive an access code list via the wireless communication connection from the mobile application, the access code list including a plurality of access code entries, the plurality of access code entries being associated with a plurality of users; determine whether the access code list is signed by a server associated with the mobile application; and based, at least in part, on whether the access code list is signed by the server, adopt the access code list as a current access code list in the memory.

In a second aspect, an electronic lock access management system includes an electronic lock having a lock memory and a wireless communication interface, and a server system comprising one or more server computing devices. The server system is communicatively connected to the electronic lock via the wireless communication interface and includes a memory storing a database including a plurality of user accounts, each user account being associated with a set of privileges and one or more properties, each property being associated with one or more locks, each of the one or more locks being associated with one or more access codes that are specific to each user. The electronic lock stores, in the lock memory, an encrypted copy of an access code list received from the server system based on a set of access codes that are associated with the electronic lock in the database.

Yet another aspect is a method for assigning access to a plurality of locks, the method comprising receiving, at a server, an access code list for an electronic lock, the access code lists including a plurality of access code entries, the plurality of access code entries being associated with a plurality of users; signing the access code list with a unique digital certificate, and sending the signed access code list to a mobile device, wherein the mobile device is in wireless communication with the electronic locks and provides the signed access code list to the electronic lock, and the electronic lock verifies the access code list using by validating the unique digital certificate.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
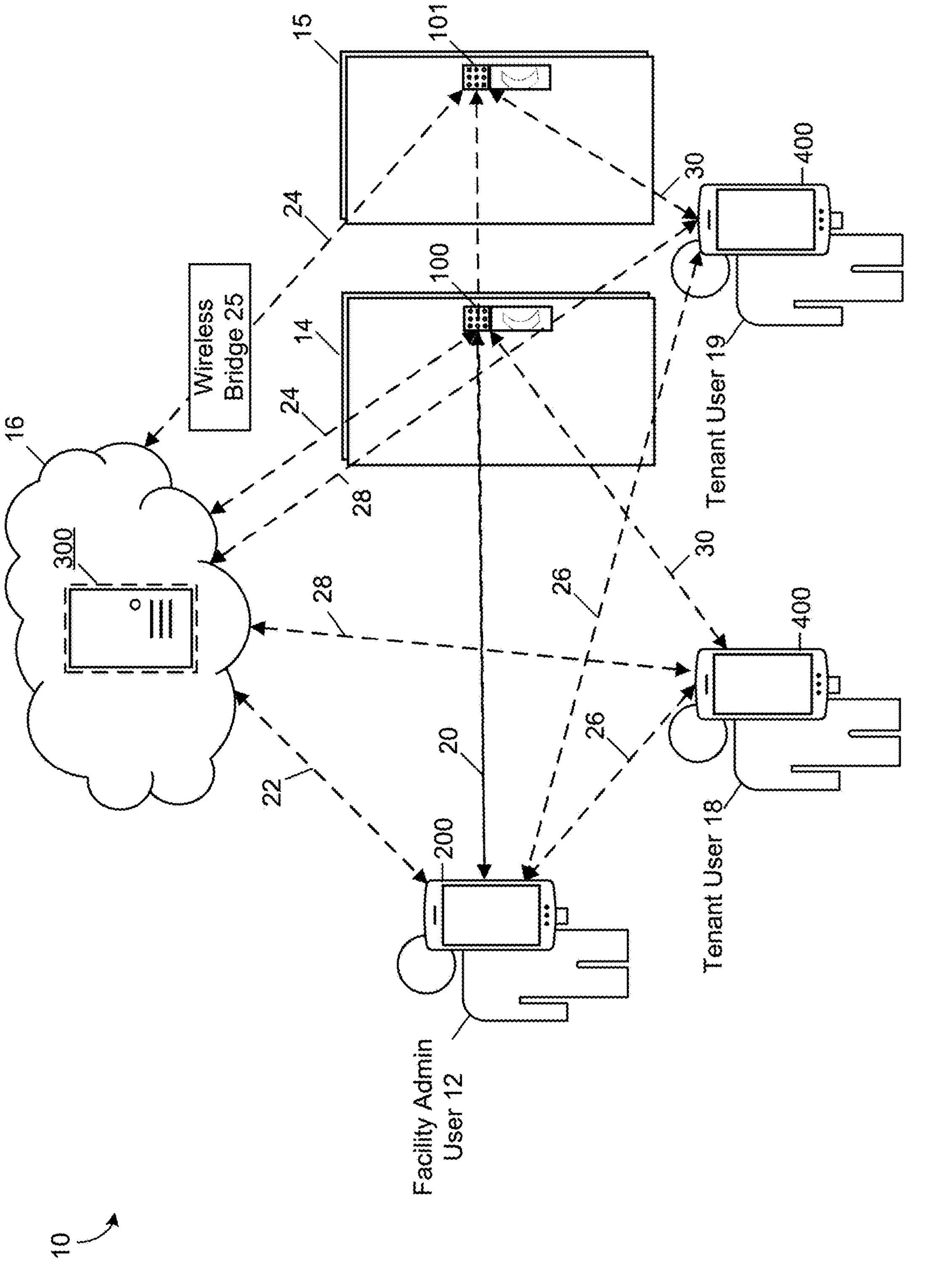
FIG. 1 illustrates an environment in which aspects of the present disclosure may be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to methods and systems for managing various user credentials and user accounts in an environment where there may be one or more electronic locks deployed, and a number of different users may require different levels of access or combinations of access rights to those locks. As described herein, methods of management of user credentials for various users who may utilize a short range wireless communication connection with the electronic lock (e.g., an NFC or Bluetooth connection) are provided that coordinate across multiple electronic locks.

In example aspects, various wireless protocols can be used. In example embodiments, a Wi-Fi protocol (802.11x) may be used to connect the electronic lock to a server (cloud) device, while a different wireless protocol (e.g., Bluetooth®, including Bluetooth® Low Energy (BLE) or Near-Field Communication (NFC)) is used for short-range communication between the electronic lock and other devices, such as a mobile device used to actuate the lock. In other embodiments, various other wireless protocols can be used, such as other short- or long-range wireless protocols (e.g., cellular, RFID, Zigbee®, Z-wave®, etc.).

The term "lock" or "lockset" is broadly intended to include any type of lock, including but not limited to, deadbolts, knob locks, lever handle locks, mortise locks, and slide locks, whether mechanical, electrical, or electro-mechanical locks. The locking points may have various mounting configurations and/or locations, including but not limited to: mortised within the doorframe, mounted externally to the doorframe or support structure, and/or affixed directly to the door.

Although this disclosure describes these features as implemented on an electronic deadbolt lock for purposes of example, these features are applicable to any type of lockset, including but not limited to, deadbolts, knobset locks, handleset locks, etc. Still further, example aspects of the present application can be applied to other types of IoT devices for which security is an issue, e.g., wireless/interconnected home devices that store user data.

A general electronic lock operational environment is described below, followed by a specific implementation within a multifamily setting. Additionally, methods and data structures maintained at electronic locks and within a cloud or server infrastructure are described which coordinate distribution of access credentials to the various electronic locks. Furthermore, methods of coordination of user accounts with access credentials, as well as with third-party Internet of things infrastructures, are also described.

I. General Electronic Lock Operational Environment

FIG. 1 illustrates an environment 10 in which aspects of the present disclosure may be implemented. A door 14 comprising an electronic lock 100 (also referred to as a wireless electronic lockset) is installed at a premises. An administrative user 12 is a master user or an authorized person, such as an owner or tenant of the premises where the door 14 comprising the electronic lock 100 is installed. The administrative user 12 has a mobile device (herein referred to as admin mobile device 200) with wireless communication capabilities, such as a smartphone or tablet. The admin mobile device 200 is capable of communicating 22 with a server 300 (in some embodiments, described as a lock provider server 300), communicating 20 with the electronic lock 100, and communicating 26 with a phone or other mobile device (herein referred to as tenant mobile device 400) of a second user, such as tenant users 18, 19.

The tenant users 18, 19 correspond to people/a person whom the administrative user 12 may wish to grant access to perform at least a subset of actions (e.g., lock, unlock, change settings) associated with the electronic lock 100. In some examples, the tenant users 18, 19 may be a user who is granted limited access rights to some subset of electronic locks, for example fewer than all electronic locks managed by the administrative user 12. In some examples, the tenant users 18, 19 may include not only long-term users of a particular property, but could also include a short-term guest, such as a vacation rental user. The administrative user 12 may wish to allow a tenant user 18 to pair the tenant mobile device 400 with the electronic lock 100 for enabling the tenant user 18 to perform electronic lock actions via the tenant mobile device 400. The administrative user 12 may wish to allow the tenant user 18 to pair the tenant mobile device 400 with the electronic lock 100 without requiring the admin mobile device 200 to be within wireless communication range of the electronic lock 100 nor the tenant user 18 to actuate a pairing button of the electronic lock 100. For example, the pairing button may be located on the interior of the door, which, prior to aspects of the present disclosure, may require that the tenant user 18 have access to an interior of the premises to actuate the pairing button. The tenant mobile device 400 is capable of communicating 28 with the server 300, communicating 30 with the electronic lock 100, and, in some instances, communicating 26 with the admin mobile device 200.

Also shown in FIG. 1, a second tenant user 19 may be granted access to electronic lock 101. The tenant user 19 may be a different user as compared to tenant user 18, and electronic locks 100, 101 may be located at the same building or at different buildings managed by the administrative user 12. For example, tenant user 18 may be granted access rights at electronic lock 100 but may not be granted access rights at electronic lock 101 (e.g., electronic lock 101 being positioned on a door 15 to which tenant user 18 should not have access). In alternative embodiments, where electronic lock 101 provides access to a common area, tenant user 18 may be granted access to both electronic lock 100 and electronic lock 101. As further described herein, electronic lock 101 is generally equivalent to electronic lock 100, and therefore only a single one of those electronic locks will be described. Similarly, tenant users 18, 19 may be treated analogously.

The server 300 can be, for example, a physical server or a virtual server hosted in a cloud storage environment 16. In some embodiments, the electronic lock 100 is also capable of communicating 24 with the server 300. Such communication can optionally occur via one or more wireless communication protocols, e.g., Wi-Fi (IEEE 802.11), short-range wireless communication to a Wi-Fi bridge (e.g., wireless bridge 25), or other connection mechanism. According to an embodiment, the server 300 generally creates and stores an administrative user account associated with the electronic lock 100, stores a pairing passcode for the electronic lock, stores a guest user account associated with the electronic lock, and in some examples, upon creation of the guest user account, provides the pairing passcode to the tenant mobile device 400. According to an aspect, when the pairing passcode is successfully entered using a keypad of the electronic lock 100, the electronic lock 100 may enter a pairing mode which enables the electronic lock 100 to pair with the tenant mobile device 400 over a Bluetooth connection.

Figure 2:
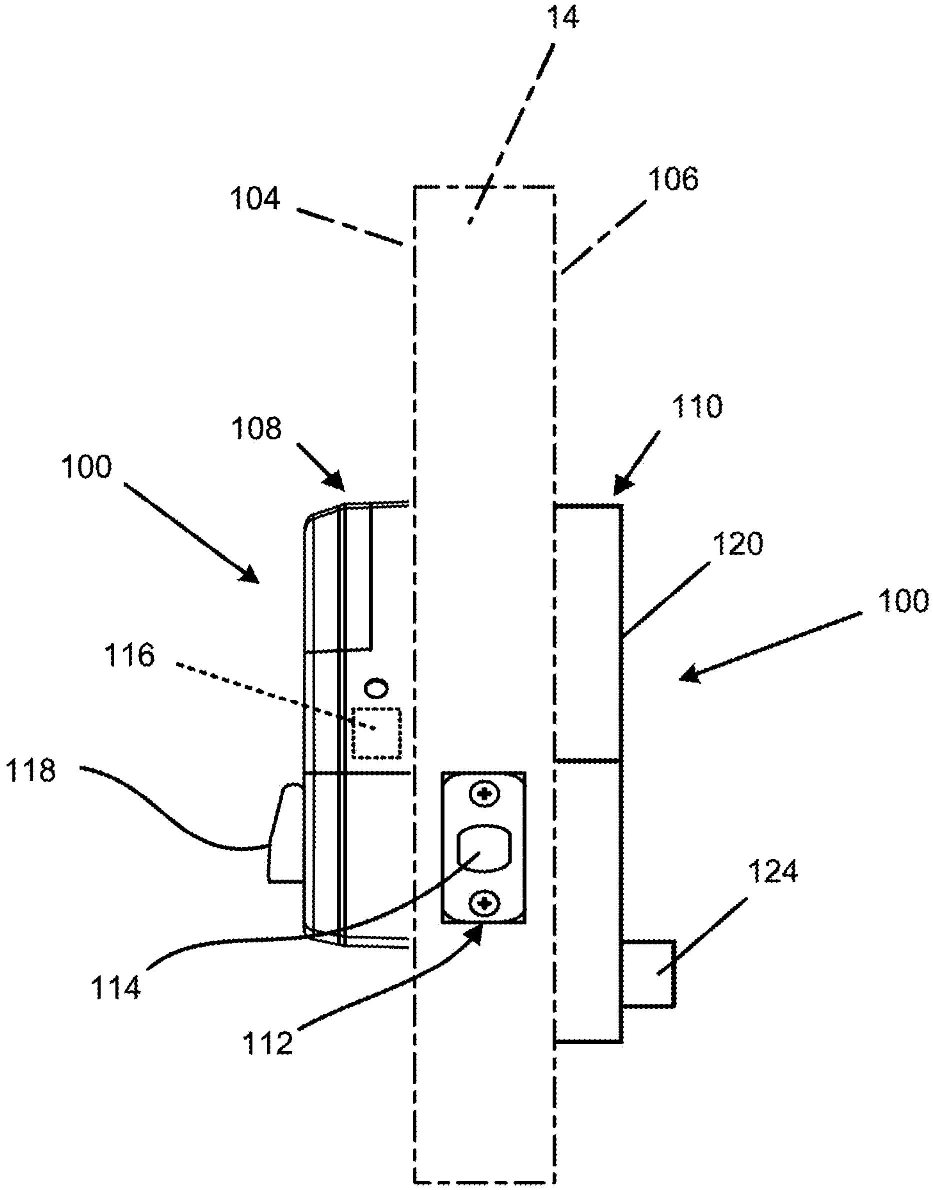
FIG. 2 illustrates a side view of a portion of the electronic lock seen in the environment of FIG. 1.
Figure 3:
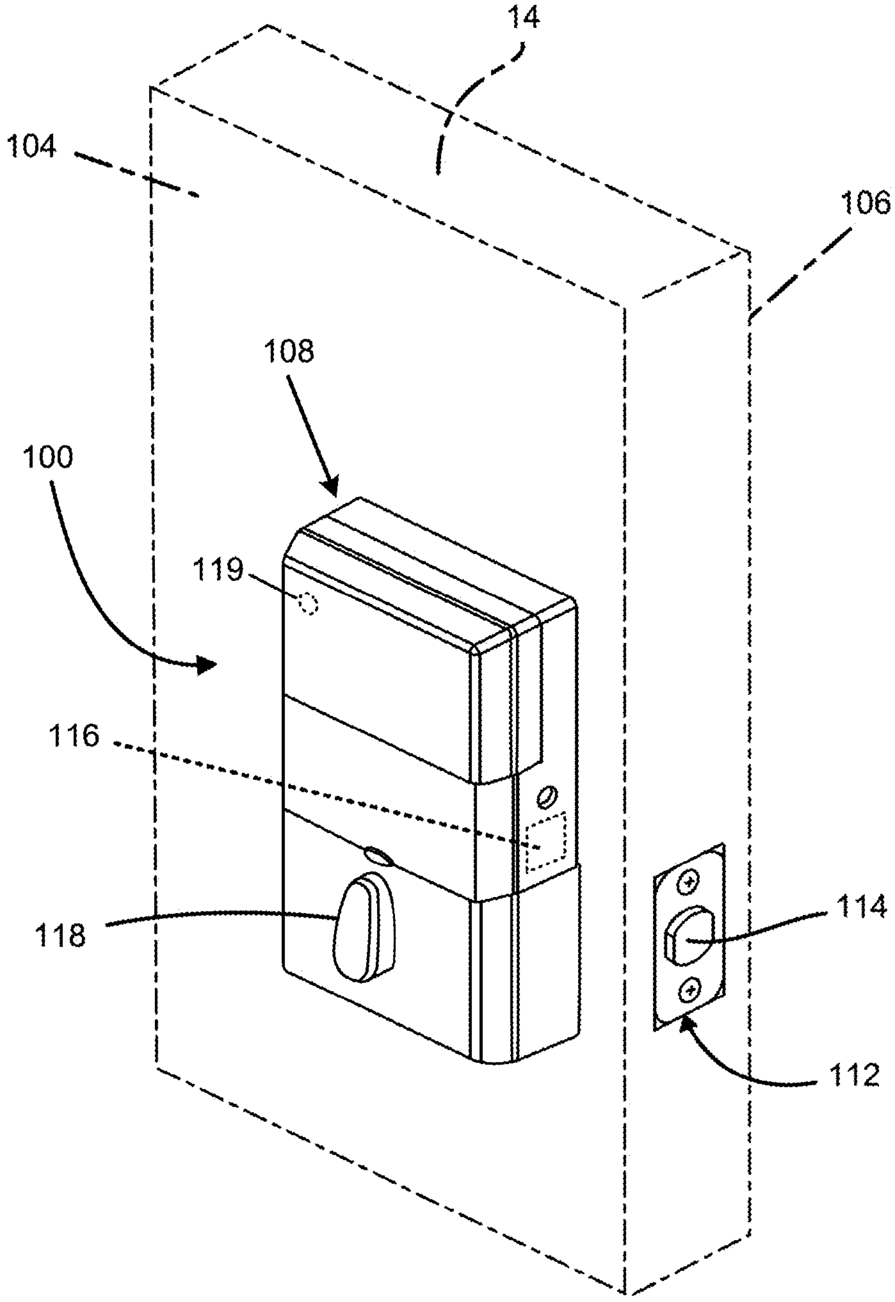
FIG. 3 illustrates a rear perspective view of a portion of the electronic lock seen in the environment of FIG. 1.
Figure 4:
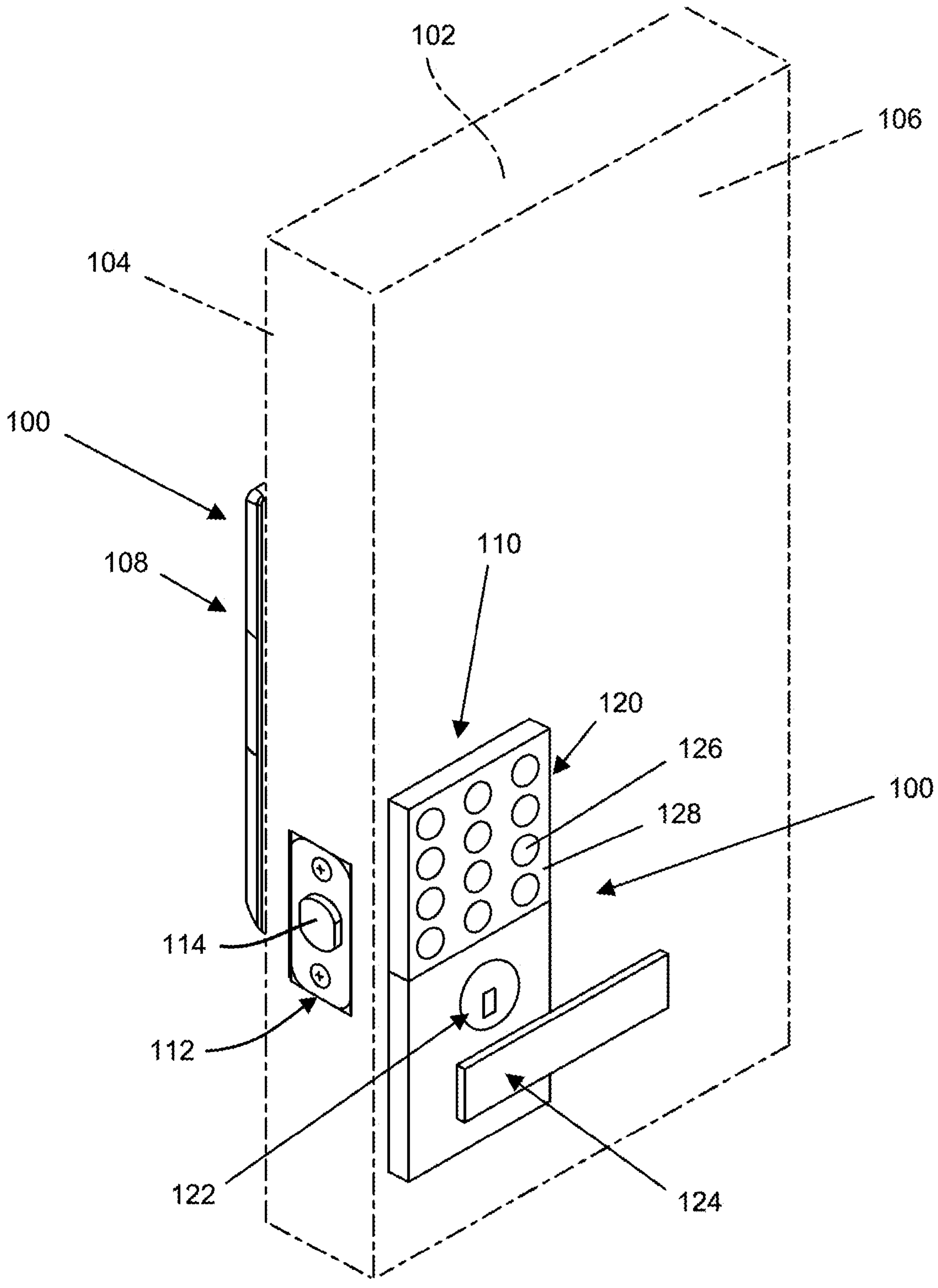
FIG. 4 illustrates a front perspective view of a portion of the electronic lock seen in the environment of FIG. 1.

FIGS. 2-4 illustrate an electronic lock 100 as installed at a door 14, according to one example of the present disclosure. The door 14 has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 14 is in an unlocked state. When the bolt 114 is extended, the bolt 114 protrudes from the door 14 into a doorjamb (not shown) to place the door in a locked state.

In some examples, the interior assembly 108 is mounted to the interior side 104 of the door 14, and the exterior assembly 110 is mounted to the exterior side 106 of the door 14. The latch assembly 112 is typically at least partially mounted in a bore formed in the door 14. The term "outside" is broadly used to mean an area outside the door 14 and "inside" is broadly used to denote an area inside the door 14. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turn piece 118 that can be used on the interior side 104 of door 14 to move the bolt 114 between the extended and retracted positions. The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device, and may be embodied as a standalone unit or as a device shared with components of the electronic lock 100. The processing unit 116 may include memory communicatively interfaced to the processor, for storing the software instructions. Alternatively, the electronic lock 100 may further comprise a separate memory device for storing the software instructions that is electrically connected to the processing unit 116 for the bi-directional communication of the instructions, data, and signals therebetween.

In some examples, the interior assembly 108 includes a pairing button 119 (shown schematically), which when actuated, initiates a BLE communication pairing mode. For example, the pairing mode may enable the electronic lock 100 to communicate with a mobile device (e.g., admin mobile device 200, tenant mobile device 400) within wireless communication range for enabling the mobile device to be paired with the electronic lock 100. As can be appreciated, initiating the BLE pairing mode via an actuation of the pairing button 119 may be limited to users who have access to the interior side 104 of the door 14. As will be described in further detail below, aspects of the present disclosure enable a tenant user 18 to initiate a BLE communication pairing mode with electronic lock 100 (with permission of the administrative user 12) without requiring the tenant user 18 to already have access to the interior side 104 of the door 14.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 14 can also include a handle 124. In some examples, the exterior assembly 110 includes the keypad 120 and not the keyway 122. In some examples, the exterior assembly 110 includes the keyway

122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid actuation passcode into the keypad 120, the bolt 114 is moved between the extended and retracted positions. In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 14. When the user inputs a valid actuation passcode via the keypad 120 that is recognized by the processing unit 116, an electrical motor is energized to retract the bolt 114 of latch assembly 112, thus permitting door 14 to be opened from a closed position. In a particular embodiment, when a tenant user 18 inputs a valid pairing passcode into the keypad 120, the electronic lock 100 may enter into a pairing mode where the electronic lock 100 is enabled to communicate and be paired with the tenant mobile device 400 when the tenant mobile device is within wireless communication range of the electronic lock 100. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. The keypad 120 can have a plurality of characters displayed thereon. For example, the keypad 120 can include a plurality of buttons 126 that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In alternative embodiments, one or more other types of user interface devices can be incorporated into the electronic lock 100. For example, in example implementations, the exterior assembly 110 can include a biometric interface (e.g., a fingerprint sensor, retina scanner, or camera including facial recognition), or an audio interface by which voice recognition could be used to actuate the lock. Still further, other touch interfaces may be implemented, e.g., where a single touch may be used to actuate the lock rather than requiring entry of a specified actuation passcode.

Figure 5:
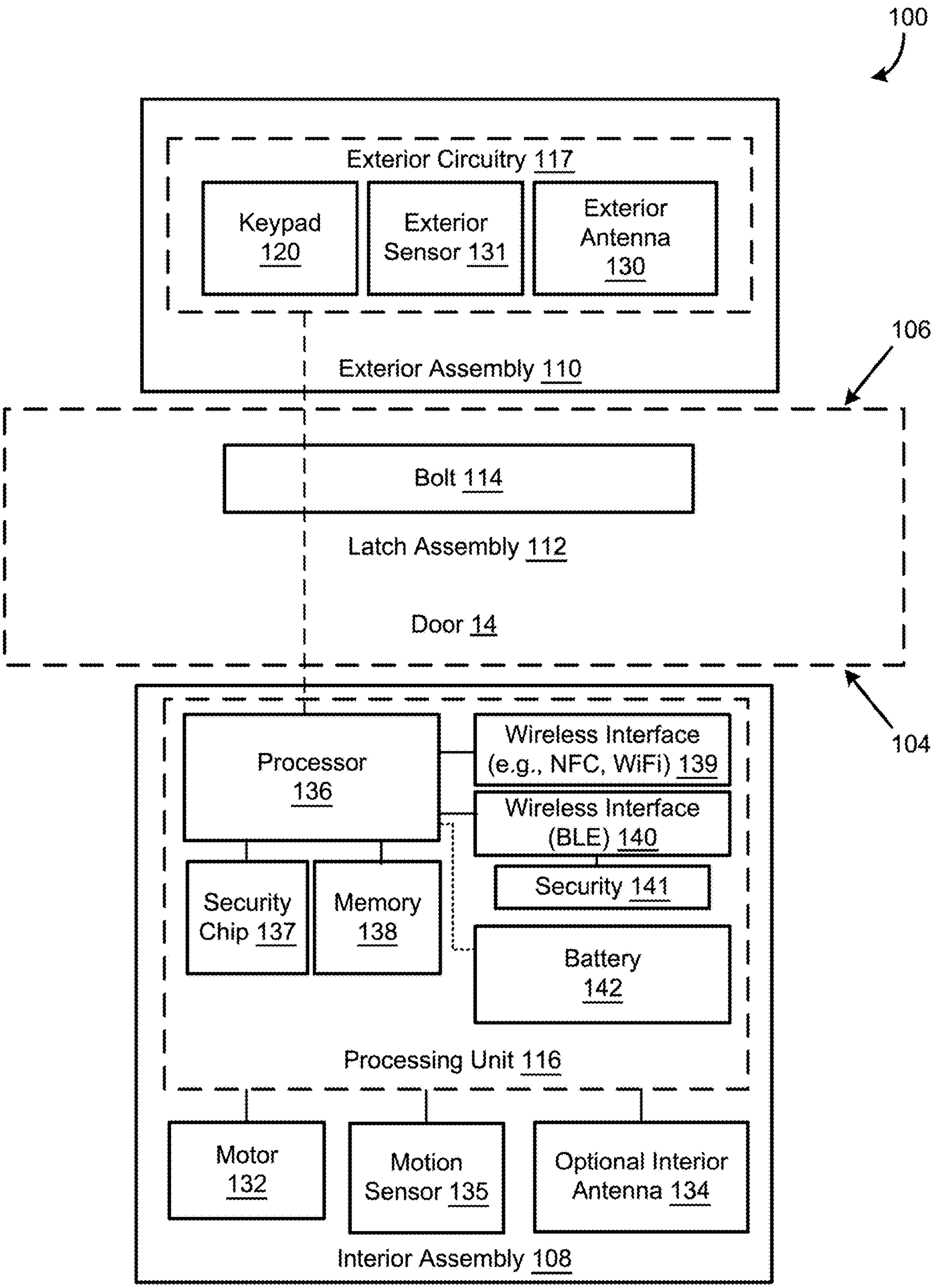
FIG. 5 illustrates a schematic representation of the electronic lock seen in the environment of FIG. 1.

FIG. 5 is a schematic representation of the electronic lock 100 mounted to the door 14. The interior assembly 108, the exterior assembly 110, and the latch assembly 112 are shown.

The exterior assembly 110 is shown to include the keypad 120 and an optional exterior antenna 130 usable for communication with a remote device. In addition, the exterior assembly 110 can include one or more sensors 131, such as a camera, proximity sensor, or other mechanism by which conditions exterior to the door 14 can be sensed. In response to such sensed conditions, notifications may be sent by the electronic lock 100 to the server 300, admin mobile device 200, or tenant mobile device 400 including information associated with a sensed event (e.g., time and description of the sensed event, or remote feed of sensor data obtained via the sensor).

The exterior antenna 130 is capable of being used in conjunction with an interior antenna 134, such that the processing unit 116 can determine where a mobile device is located. Only a mobile device (e.g., admin mobile device 200 or tenant mobile device 400) that is paired with the electronic lock 100 and determined to be located on the exterior of the door 14 is able to actuate (unlock or lock) the door. This prevents unauthorized users from being located exterior to the door 14 of the electronic lock 100 and taking advantage of an authorized mobile device that may be located on the interior of the door, even though that authorized mobile device is not being used to actuate the door. However, such a feature is not required, but can add additional security. In alternative arrangements, the electronic lock 100 is only actuable from either the keypad 120 (via entry of a valid actuation passcode) or from an application installed on the mobile device (e.g., admin mobile device 200 or tenant mobile device 400). In such arrangements, because touch alone at the exterior of the door 14 cannot actuate the lock, the exterior antenna 130 may be excluded entirely.

As described above, the interior assembly 108 includes the processing unit 116. The interior assembly 108 can also include a motor 132 and an optional interior antenna 134.

As shown, the processing unit 116 includes at least one processor 136 communicatively connected to a security chip 137, a memory 138, various wireless communication interfaces (e.g., including a Wi-Fi interface 139 and/or a Bluetooth interface 140), and a battery 142. The processing unit 116 is located within the interior assembly 108 and is capable of operating the electronic lock 100, e.g., by actuating the motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138. In certain embodiments, the processing unit 116 can include a plurality of processors 136, including one or more general purpose or specific purpose instruction processors. In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the electronic lock 100. In still other examples, the processor 136 receives signals from the Bluetooth interface 140 to determine whether to actuate the electronic lock 100.

In some embodiments, the processing unit 116 includes a security chip 137 that is communicatively interconnected with one or more instances of the processor 136. The security chip 137 can, for example, generate and store cryptographic information usable to generate a certificate usable to validate the electronic lock 100 with a remote system, such as the server 300 or mobile device (e.g., admin mobile device 200 or tenant mobile device 400). In certain embodiments, the security chip 137 includes a one-time write function in which a portion of memory of the security chip 137 can be written only once, and then locked. Such memory can be used, for example, to store cryptographic information derived from characteristics of the electronic lock 100, or its communication channels with server 300 or one or more mobile devices 200, 400. Accordingly, once written, such cryptographic information can be used in a certificate generation process which ensures that, if any of the characteristics reflected in the cryptographic information are changed, the certificate that is generated by the security chip 137 would become invalid, and thereby render the electronic lock 100 unable to perform various functions, such as communicate with the server 300 or mobile device 200, 400, or operate at all, in some cases.

In some embodiments, the security chip 137 may be configured to generate a pairing passcode that, when entered using the keypad 120 of the electronic lock 100, triggers a BLE pairing mode of the electronic lock 100 that enables the electronic lock 100 to pair with a proximate mobile device (e.g., tenant mobile device 400 on which an electronic lock application associated with the electronic lock 100 is operating). In some examples, the pairing passcode is provided to the administrative user 12 upon initial setup/activation of the electronic lock 100 (e.g., via an electronic lock application associated with the electronic lock 100 operating on the admin mobile device 200). In some examples, the pairing passcode is a random value. In some examples, the administrative user 12 may be enabled to change the pairing passcode by setting their own code or by requesting a random value to be generated by the electronic lock application operating on the admin mobile device 200. In some examples, the length of the pairing passcode is variable. According to an aspect, for increased security, the pairing passcode may be a limited-use passcode. For example, the pairing passcode may be limited to a single use or may be active for a preset or administrative user-selected time duration. In further examples, a digit of the pairing passcode may correspond to a setting that may instruct the electronic lock 100 to perform one or more of: disable the pairing passcode after it has been used, keep the pairing passcode enabled after it has been used, or reset the pairing passcode to a new random value after it has been used.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 116 can include one or more wireless interfaces, such as Wi-Fi interface 139 and/or a Bluetooth interface 140. Other RF circuits can be included as well. In the example shown, the interfaces 139, 140 are capable of communication using at least one wireless communication protocol. In some examples, the processing unit 116 can communicate with a remote device via the Wi-Fi interface 139, or a local device via the Bluetooth interface 140. In some examples, the processing unit 116 can communicate with one or both of the mobile device 200,400 and server 300 via the Wi-Fi interface 139, and can communicate with the mobile device 200,400 when the mobile device is in proximity to the electronic lock 100 via the Bluetooth interface 140. In some embodiments, the processing unit 116 is configured to communicate with the mobile device 200, 400 via the Bluetooth interface 140, and communications between the mobile device 200,400 and electronic lock 100 when the mobile device 200, 400 is out of range of Bluetooth wireless signals can be relayed via the server 300, e.g., via the Wi-Fi interface 139.

Of course, in alternative embodiments, other wireless protocols could be implemented as well, via one or more additional wireless interfaces. In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

In a particular embodiment, the processor 136 will receive a signal at the Bluetooth interface 140 via a wireless communication protocol (e.g., BLE) from a mobile device 200, 400 for communication of an intent to actuate the electronic lock 100. As illustrated in further detail below, the processor 136 can also initiate communication with the server 300 via Wi-Fi interface 139 (or another wireless interface) for purposes of validating an attempted actuation of the electronic lock 100, or receiving an actuation command to actuate the electronic lock 100. Additionally, various other settings can be viewed and/or modified via the Wi-Fi interface 139 from the server 300; as such, a user (e.g., administrative user 12 or tenant user 18) of a mobile device 200, 400 may access an account associated with the electronic lock 100 to view and modify settings of that lock, which are then propagated from the server 300 to the electronic lock 100. In alternative embodiments, other types of wireless interfaces can be used; generally, the wireless interface used for communication with a mobile device can operate using a different wireless protocol than a wireless interface used for communication with the server 300.

In a particular example, the Bluetooth interface 140 comprises a Bluetooth Low Energy (BLE) interface. Additionally, in some embodiments, the Bluetooth interface 140 is associated with a security chip 141, for example, a cryptographic circuit capable of storing cryptographic information and generating encryption keys usable to generate certificates for communication with other systems, e.g., mobile device 200, 400.

The interior assembly 108 also includes the battery 142 to power the electronic lock 100. In one example, the battery 142 may be a standard single-use (disposable) battery. Alternatively, the battery 142 may be rechargeable. In still further embodiments, the battery 142 is optional altogether, replaced by an alternative power source (e.g., an AC power connection).

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 14 is locked and the motor 132 receives a lock command, then no action is taken. If the door 14 is locked and the motor 132 receives an unlock command, then the motor 132 actuates the bolt 114 to unlock the door 14.

As noted above, the optional interior antenna 134 may also be located in the interior assembly 108. In some examples, the interior antenna 134 is capable of operating together with the exterior antenna 130 to determine the location of the mobile device 200, 400. In some examples, only a mobile device determined to be located on the exterior side 106 of the door 14 is able to unlock (or lock) the door 14. This prevents unauthorized users from being located near the electronic lock 100 and taking advantage of an authorized mobile device that may be located on the interior side 104 of the door 14, even though the authorized mobile device is not being used to unlock the door 14. In alternative embodiments, the interior antenna 134 can be excluded entirely, since the electronic lock 100 is actuated only by an authorized mobile device.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

In still further example embodiments, the electronic lock 100 can include an integrated motion sensor 135. Using such a motion sensor (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200, 400 in proximity to the electronic lock 100.

Of course, in alternative embodiments, other lock actuation sequences may not require use of a motion sensor 135. For example, if the mobile device 200, 400 is in valid range of the electronic lock 100 when using a particular wireless protocol (e.g., Bluetooth Low Energy), then a connection will be established with the electronic lock 100. Other arrangements are possible as well, using other connection sequences and/or communication protocols.

Figure 6:
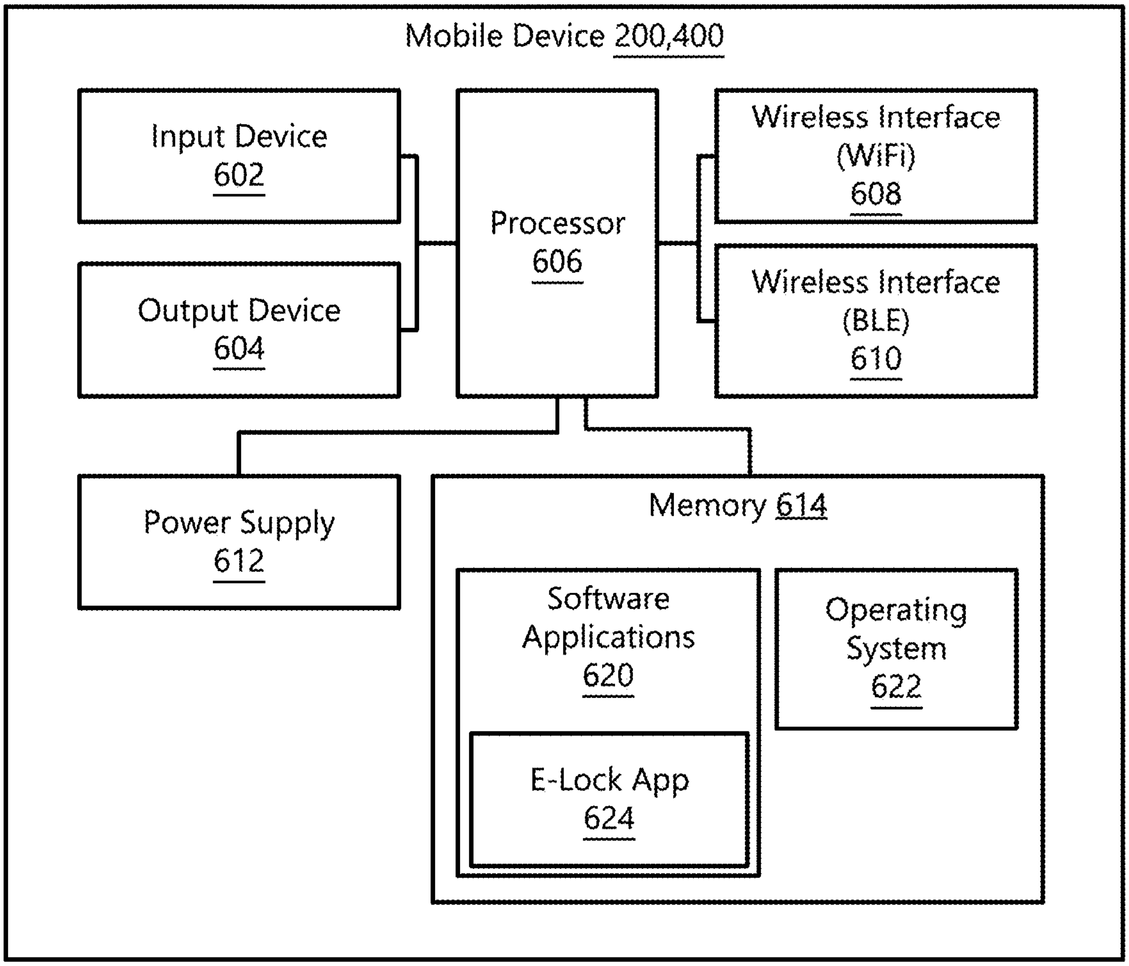
FIG. 6 illustrates a schematic representation of a mobile device seen in the environment of FIG. 1.

FIG. 6 illustrates a schematic diagram of a mobile device, such as admin mobile device 200 and tenant mobile device 400, usable in embodiments of the disclosure to enable Bluetooth® pairing with the electronic lock 100 via a pairing passcode. In some embodiments, the mobile device 200, 400 operates to form a Bluetooth or BLE connection with a network enabled security device such as the electronic lock 100. The mobile device 200, 400 then communicates with the cloud server 300 via a Wi-Fi or mobile data connection. The mobile device 200,400 thus can operate to communicate information between the electronic lock 100 and the server 300. The mobile device 200, 400 shown in FIG. 6 includes an input device 602, an output device 604, a processor 606, a Wi-Fi interface 608, a wireless BLE interface 610, a power supply 612, and a memory 614.

The input device 602 operates to receive input from external sources. Such sources can include inputs received from a user (e.g., the administrative user 12 or the tenant user 18). The inputs can be received through a touchscreen, a stylus, a keyboard, etc.

The output device 604 operates to provide output of information from the mobile device 200, 400. For example, a display can output visual information while a speaker can output audio information.

The processor 606 reads data and instructions. The data and instructions can be stored locally, received from an external source, or accessed from removable media.

The wireless Wi-Fi interface 608 is similar to the Wi-Fi interface 139. A Wi-Fi connection 22, 28 can be established with the server 300.

The wireless BLE interface 610 is similar to the Bluetooth interface 140. A BLE connection 20, 30 can be established with the electronic lock 100.

The power supply 612 provides power to the processor 606.

The memory 614 includes software applications 620 and an operating system 622. The memory 614 contains data and instructions that are usable by the processor to implement various functions of the mobile device 200,400.

The software applications 620 can include applications usable to perform various functions on the mobile device 200,400. One such application is an electronic lock application 624. In a particular embodiment, when the electronic lock application 624 is operating on the admin mobile device 200, the electronic lock application 624 can be configured to provide a user interface, setup/activate the electronic lock 100, generate an administrative user account that is associated with the electronic lock 100, present the administrative user 12 with a random pairing passcode for the electronic lock 100 (which may be reset or turned off by the administrative user 12), send (e.g., via a BLE connection 20 with the electronic lock 100 or Wi-Fi connection 22,24) the pairing passcode to the electronic lock 100 for storage, and store the pairing passcode locally on the admin mobile device 200 and/or the server 300. In another embodiment, the electronic lock application 624 may provide a selectable 'add user' feature, which when selected, enables the administrative user 12 to add another user (e.g., the tenant user 18) to have access to the electronic lock 100, receive administrative user-input of the tenant user's electronic contact information (e.g., mobile device phone number, email address, messaging application identifier, social media account identifier), generate a link that can be shared with the tenant user 18 that allows the tenant user 18 to access the electronic lock application 624 and create a tenant user account that is associated with the administrative user account and the electronic lock 100, and send a message including the link to the tenant mobile device 400 via the received electronic contact information.

In a particular embodiment, responsive to receiving the link and receiving a selection of the link, the electronic lock application 624 may be installed on the tenant mobile device 400 and used to create a tenant user account that is associated with the administrative user account and the electronic lock 100. When the electronic lock application 624 is operating on the tenant mobile device 400, the electronic lock application 624 can be configured to determine when the tenant mobile device 400 is in proximity to the electronic lock 100, determine that the tenant mobile device 400 is not paired with the electronic lock 100 via a BLE connection, and provide (e.g., display), in a user interface, the pairing passcode and instructions for pairing the tenant mobile device 400 with the electronic lock 100. According to an embodiment, when the pairing passcode is entered using the keypad 120 of the electronic lock 100, the electronic lock 100 may be triggered to enter a Bluetooth pairing mode. The electronic lock application 624 may be further configured to determine that the electronic lock 100 is in Bluetooth pairing mode and perform a pairing process with the electronic lock 100, which when completed, enables the tenant user 18 to perform at least a subset of electronic lock actions (e.g., actuate the electronic lock 100, add an access/actuation passcode) via the electronic lock application 624.

II. MultiFamily Lock and Server Account Integration

Referring now to FIGS. 7 to 16, aspects of lock and server account integration are described. In particular, FIGS. 7 to 9 describe a particularized electronic lock connection arrangement with a server system, such as a cloud server, with FIGS. 10 to 16 describing management of access codes within such an environment.

In examples described below, an electronic lock access management system is provided that includes an electronic lock 100 having a lock memory and a wireless communication interface, and a server system comprising one or more server computing devices 300 (e.g., a cloud server system). The server system 300 is communicatively connected to the electronic lock 100 via the wireless interface and includes a memory storing a database including a plurality of user accounts, each user account being associated with a set of privileges and one or more properties. The one or more properties may be associated with one or more locks, and each of the locks can be associated with one or more access codes that are specific to each user. Accordingly, access codes, and lock associations with those access codes, can be arranged on a per-user basis within a database, with access codes conveniently added and/or removed as needed to adjust rights of particular tenants or other users within a multifamily environment. The electronic lock stores, in the lock memory, an encrypted copy of an access code list received from the server system based on a set of access codes that are associated with the electronic lock in the database.

In some example aspects, an electronic lock 100 can establish a wireless communication connection with a mobile device executing a mobile application on behalf of a user. The electronic lock 100 can then receive an access code list via the wireless communication connection from the mobile application. The access code list can include a plurality of access code entries associated with a plurality of users, and determine whether the access code list is signed by a server associated with the mobile application. Based, at least in part, on whether the access code list is signed by the server, the electronic lock can adopt the access code list as a current access code list in the memory. Thus, no matter which user approaches an electronic lock, an updated access code list can be securely propagated to that electronic lock via an authorized user's mobile device.

Figure 7:
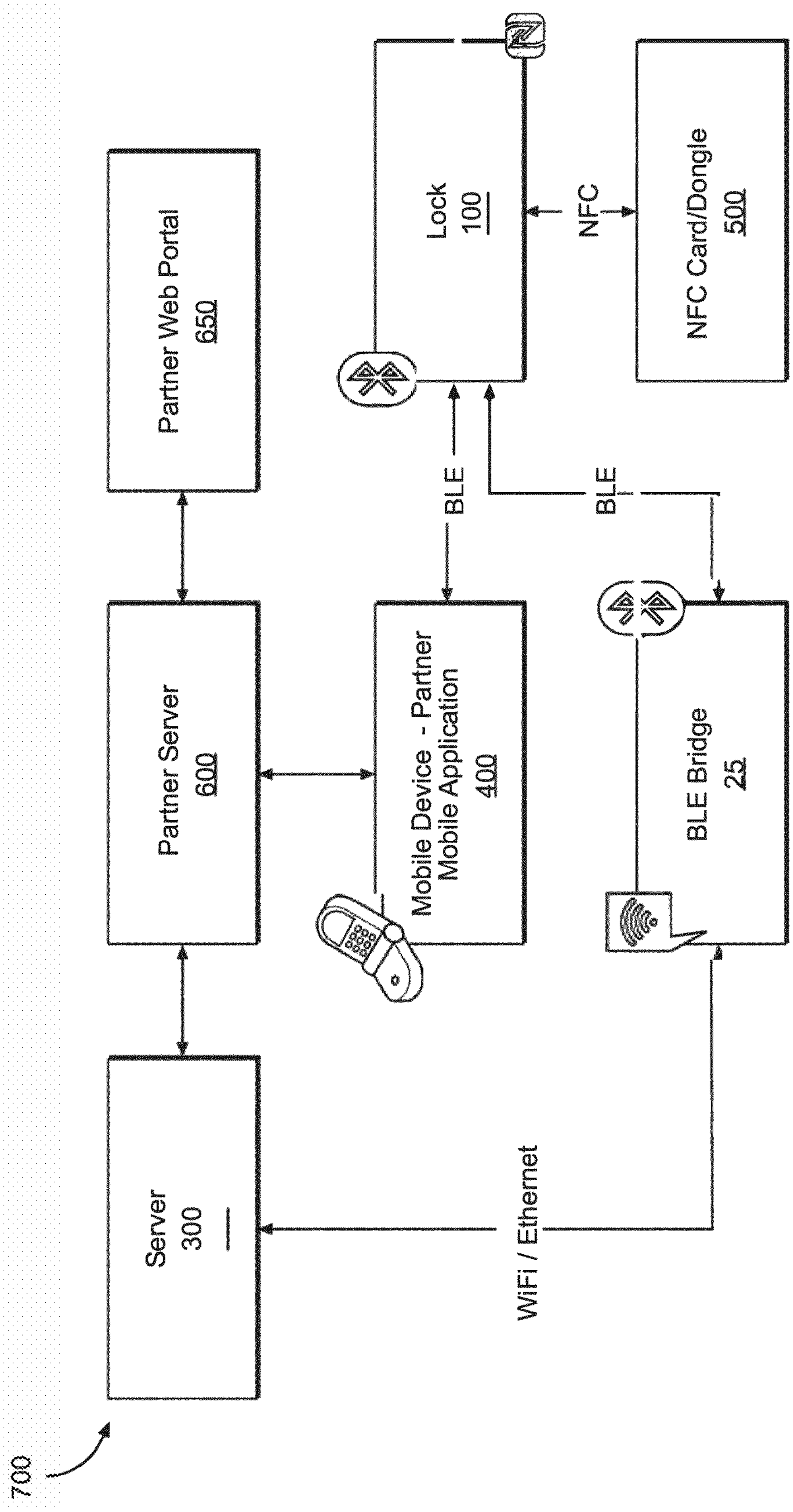
FIG. 7 illustrates a specific embodiment of an environment in which a multifamily lock may be implemented.

FIG. 7 illustrates a specific embodiment of an environment 700 in which a multifamily lock may be implemented. The example environment 700 generally represents a particular arrangement in which a mobile device, such as a tenant mobile device 400 has installed a mobile application provided by a mobile application provider other than the manufacturer of the electronic lock 100. For example, the mobile application provider may be a partner of the electronic lock provider, and may provide an integrated Internet of Things home automation solution or security solution for multifamily settings.

In the example shown, the electronic lock 100 may communicate with the mobile device 400 or with an access card 500. Communication between the electronic lock 100 and mobile device 400 may, for example, utilize a Bluetooth wireless connection, while communication between the electronic lock 100 and access card 500 may utilize an NFC-based connection. Other arrangements are possible as well.

In the example shown, the electronic lock 100 may communicate with a server 300 via a wireless bridge 25, shown as a Bluetooth bridge. In the example shown, the wireless bridge 25 allows the electronic lock 100 to communicate in a short range to the wireless bridge 25, which in turn may communicate via Wi-Fi (e.g. via a home or premises Wi-Fi network) with server 300.

Additionally, as shown, the server 300 may be communicatively connected with a partner server 600 (in some embodiments, described as a partner cloud server), which supports the mobile application executing on mobile device 400. In such an arrangement, the partner server 600 may have a partner web portal 650 at which account settings may be adjusted, or to define a relationship to the server 300 from partner server 600. Other examples are possible as well.

Figure 8:
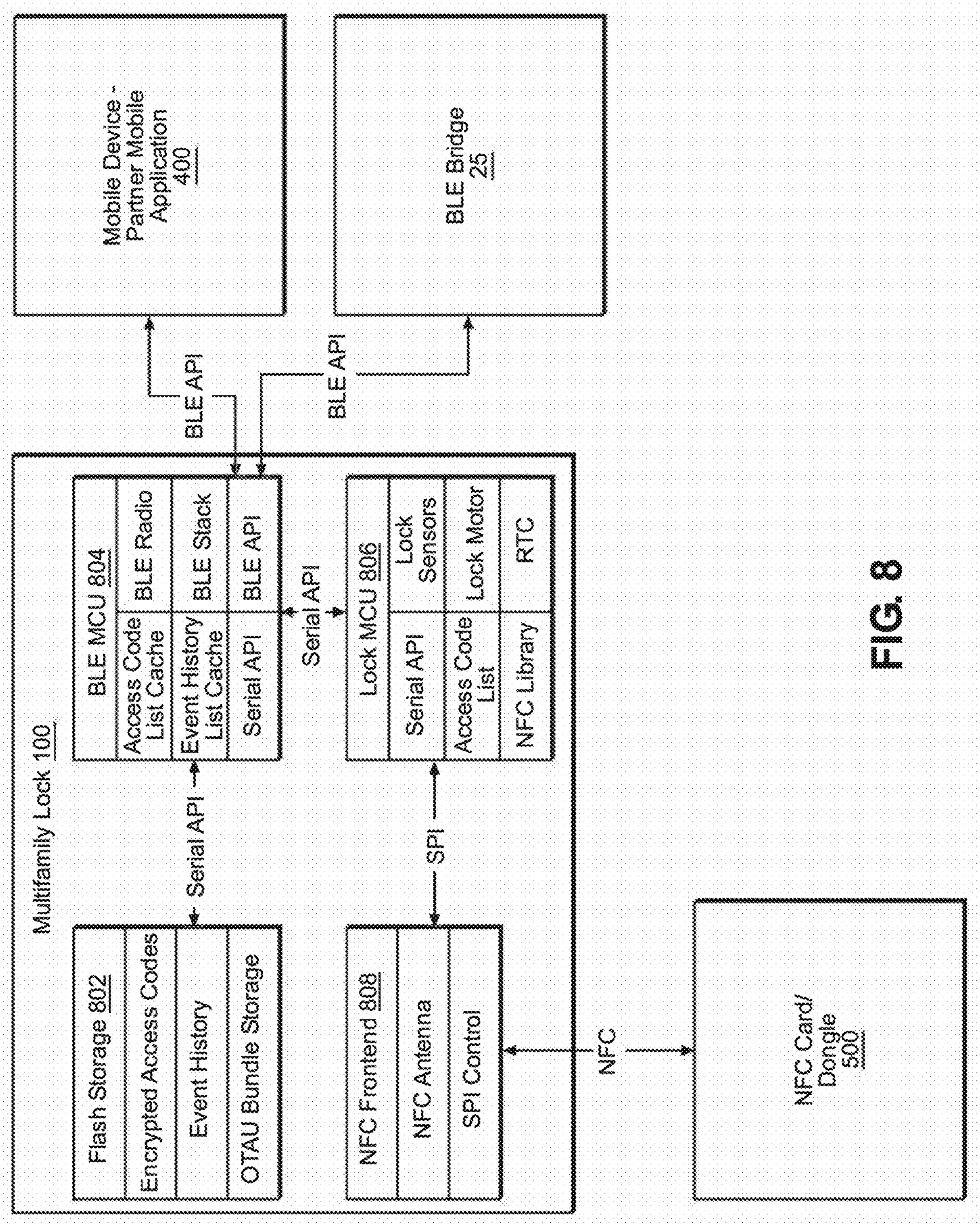
FIG. 8 illustrates specific data exchange interfaces of a multifamily lock of FIG. 7.

FIG. 8 illustrates specific data exchange interfaces of an electronic lock 100 implemented within an environment such as seen in FIG. 7. In particular, the data exchange interfaces illustrate the specific data and communication features implemented at an electronic lock 100 for communication with mobile device 400, wireless bridge 25, and access card 500.

As illustrated, the electronic lock 100 includes a flash storage 802, which stores an encrypted set of access codes that may be used for actuating the electronic lock, as well as an event history and other data storage. A Bluetooth controller 804 may also include memory that stores an access code list and event history. The Bluetooth controller 804 also manages a Bluetooth application programming interface (API) that defines an interface for communication with mobile device 400 and wireless bridge 25.

The Bluetooth controller 804 is communicatively connected with a lock controller 806, which controls core functionality of the electronic lock 100, including actuation of the lock motor and receipt of data from lock sensors. The lock controller 806 maintains a master access code list of access codes that may be used to actuate the lock via Bluetooth or NFC communication. An NFC interface 808 may be communicatively connected to the lock controller 806, and provide for wireless NFC-based communication with an access card 500.

In alternative embodiments, other types of wireless communication interfaces may be included in the electronic lock 100. For example, in addition to the Bluetooth interface provided by Bluetooth controller 804, 802.11x wireless communication may be provided by a wireless communication controller and/or antenna. In such instances, a BLE Bridge 25 may be optional within an overall solution.

Figure 9:
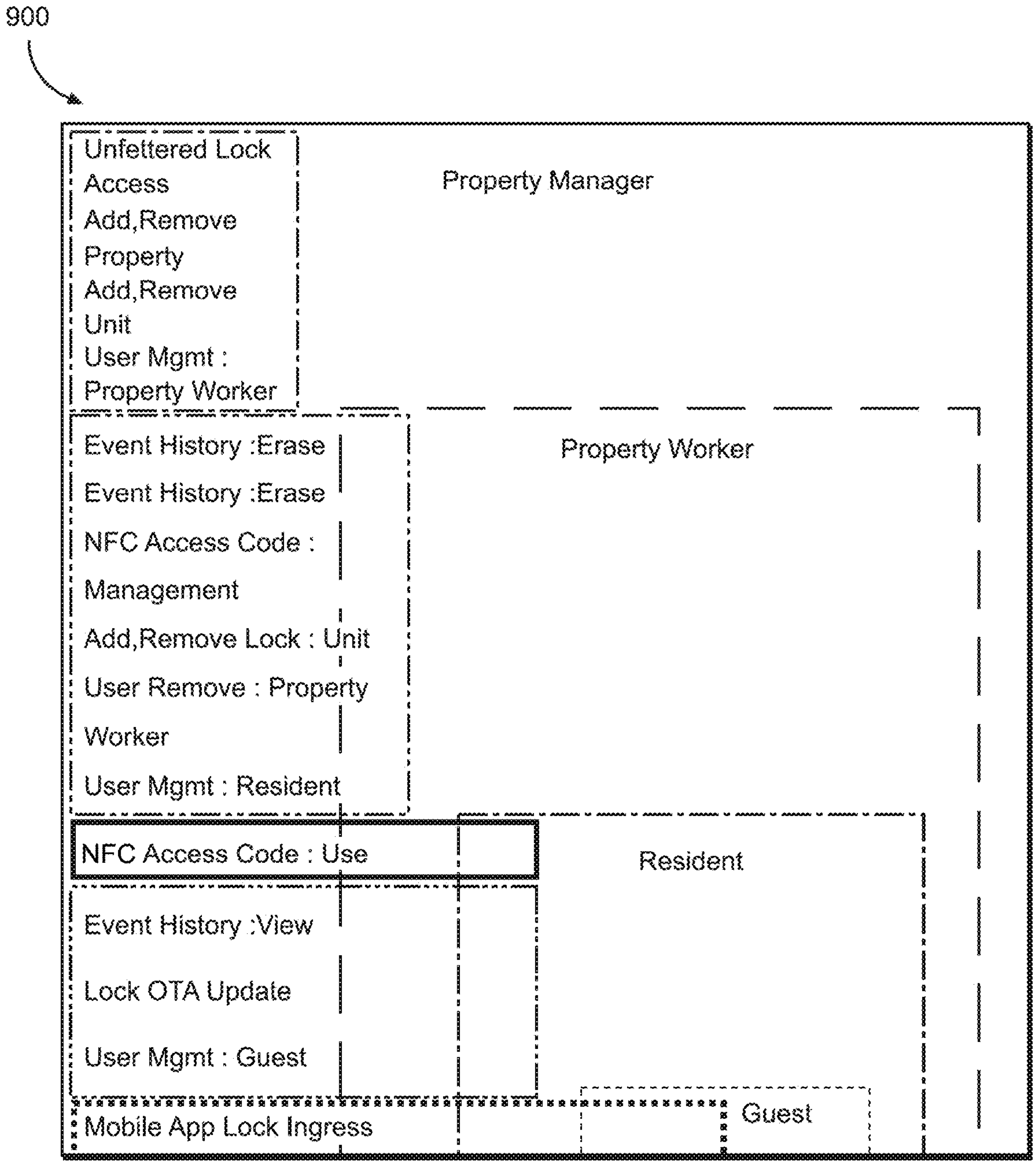
FIG. 9 illustrates a hierarchy of user accounts that may be provided access to a multifamily lock in example embodiments.

FIG. 9 illustrates a hierarchy 900 of user accounts that may be provided access to a multifamily lock in example embodiments. The hierarchy 900 illustrates various access rates that may be provided to different types or classes of users who require access to a multifamily implementation of electronic lock 100. For example, an administrative user, such as a property manager, will have unfettered lock access to add or remove specific properties or units, or property workers, from an overall account. In turn, each property worker may have the right to view and erase event histories, manage NFC access codes for locks associated with a particular property, add or remove locks that are associated with particular units at a property, remove other property workers, or manage residents who are associated with the property (e.g. tenants). Tenants, referred to in the hierarchy 900 as a residence, may have usage rights associated with being able to use NFC access codes, view event histories, or receive over the air updates for the lock via a tenant mobile device. Tenants may also be granted access rights to manage guest users, for example adding or removing limited time use access rights to particular guests of that resident. Guest users may be limited to only use of the mobile application, for example on a mobile device 400, for actuating the electronic lock 100. Guests will generally not have access rights to the view other guest accounts or tenant accounts, or otherwise adjust settings of the electronic lock 100.

III. Access Code Updates in Multifamily Setting

Referring now to FIGS. 10 through 16, an organization, arrangement, and management of access codes for various user types are described. This can include, for example, the specific timing and sequence for distributing access codes for various users to one or more electronic locks that may be used in the multifamily setting.

Generally, prior to establishment of access codes in association with particular users, each user will be defined by inclusion of an account at server 300. Additionally, each block may be registered with server 300, for example using a lock activation process. One example lock activation process is described in US publication number 2019/0327098, entitled "Secure Provisioning of Internet of things Devices, Including Electronic Locks", the disclosure of which is hereby incorporated by reference in its entirety. Upon establishing respective registrations of users and locks at the server 300, a user may communicate with an electronic lock to establish access codes for particular user devices. The communication with the electronic lock to establish access codes is described below. In general, a method of authenticating an electronic lock is described in co-pending U.S. patent application Ser. No. 17/276,068, entitled "Authentication of Internet of things Devices, including Electronic Locks", and having, the disclosure of which is also hereby incorporated by reference in its entirety. Additionally, a method of secure communication between a mobile device and electronic lock using mutual authentication is described in U.S. Provisional Patent Application No. 63/175,360, entitled "Establishment of Secure Bluetooth Connection to Internet of Things Devices, such as Electronic Locks", and having, the disclosure of which is also incorporated by reference in its entirety.

Figure 10:
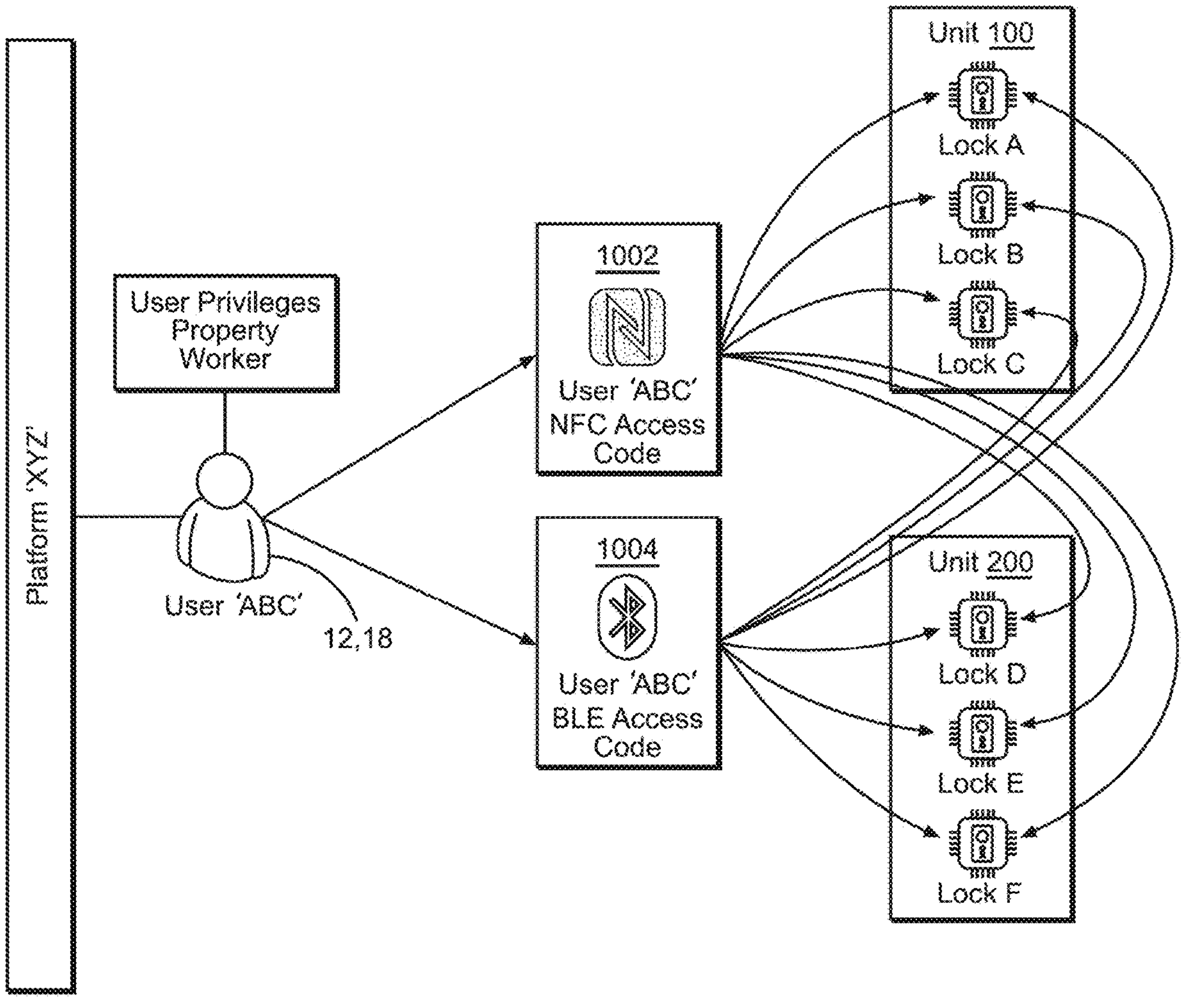
FIG. 10 illustrates an example relationship among users and user access codes for various multifamily locks within a multifamily environment.

FIG. 10 illustrates an example relationship among users and user access codes for various multifamily locks within a multifamily environment. In the example configuration shown, a user, who may be an administrative user 12 or tenant user 18 (or any user having a role as described above in conjunction with FIG. 9) is registered on the platform. The platform generally corresponds to the server account associated with the electronic lock or locks that will be managed using multifamily credential management.

As illustrated, the user may have a first access code (e.g., NFC Access code 1002) that may be used in conjunction with NFC-based actuation of an electronic lock, as well as a second access code 1004 that may be used in conjunction with Bluetooth-based actuation of the same electronic lock. As illustrated, the same Bluetooth access code and NFC access code may be used to actuate more than one lock at more than one location. In other implementations, each lock will have a separate Bluetooth access code, but may use a common NFC access code.

In the specific arrangement as illustrated, each of the access codes and locks are associated with the user account of the user. That is, at the platform, each access code is specifically assigned to a user account, and locks are assigned to the access code and account. Accordingly, access code lists may be generated for each lock, while lists of electronic locks that may be associated with a particular user are readily definable as well.

Figure 11:
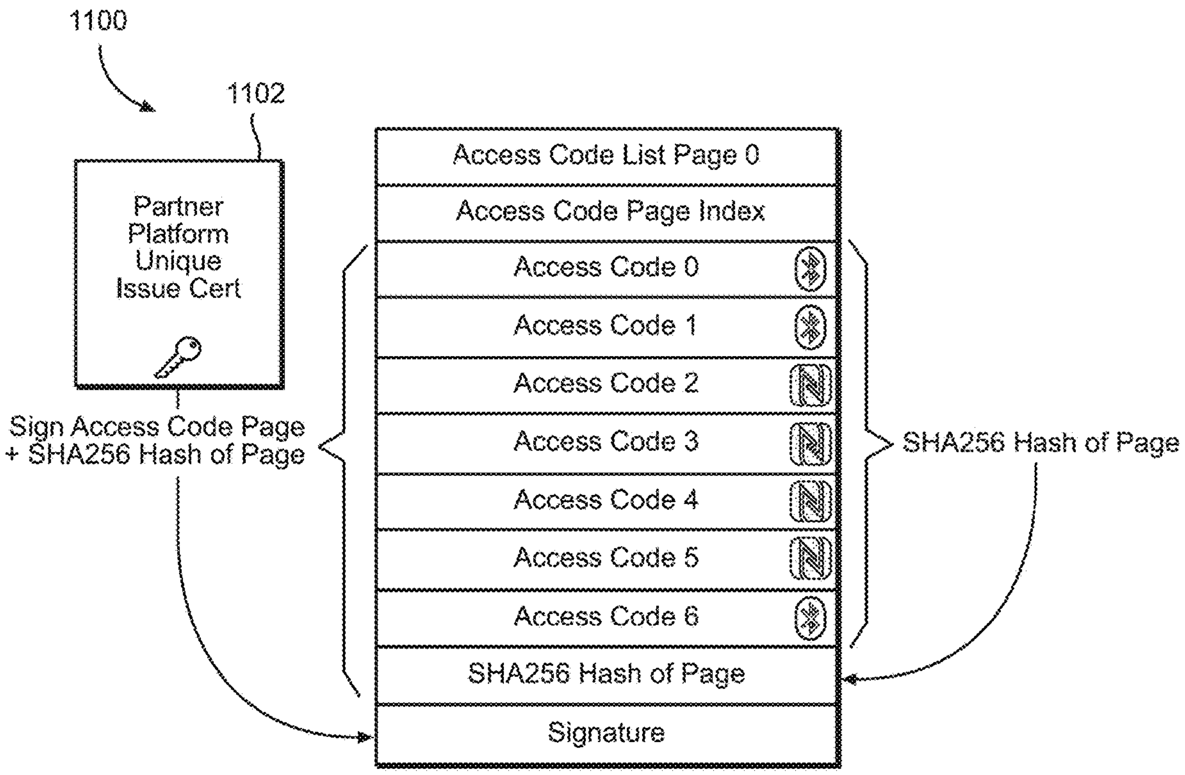
FIG. 11 illustrates an example access code list that may be used to securely store user access codes on a multifamily lock or elsewhere within an overall network environment.

FIG. 11 illustrates an example access code list 1100 that may be used to securely store user access codes on a multifamily lock or elsewhere within an overall network environment. In general, the access code list 1100 represents a list that may be stored on an electronic lock and may be associated with more than one user (e.g. all of the users who may have access rights at the particular electronic lock). In the example shown, a series of access codes can include both Bluetooth and NFC-based access codes. To secure the access code list, and thereby prevent either corruption or compromise of any of the access codes, a modification detection scheme is provided in which a hash of the page of access codes is generated and stored as part of the page (i.e., the access code list). Additionally, a certificate 1102 may be used to sign the access code page as combined with the hash of the access code page, to generate a signature which can also be appended to the access code list 1100. The certificate may be a unique certificate issued by a partner platform or by the lock platform cloud (e.g., the server 300), which is generic across accounts but known only to the issuer of that certificate. Accordingly, the issuer of the certificate can validate whether the access code list has been compromised.

In some embodiments, when an electronic lock 100 receives an access code list from, e.g., a server 300 via a mobile device (e.g., mobile device 200, 400), the electronic lock can verify that the access code list was signed by a certificate 1102 from the server, to ensure that the access code list was authorized by the server 300.

Figure 12:
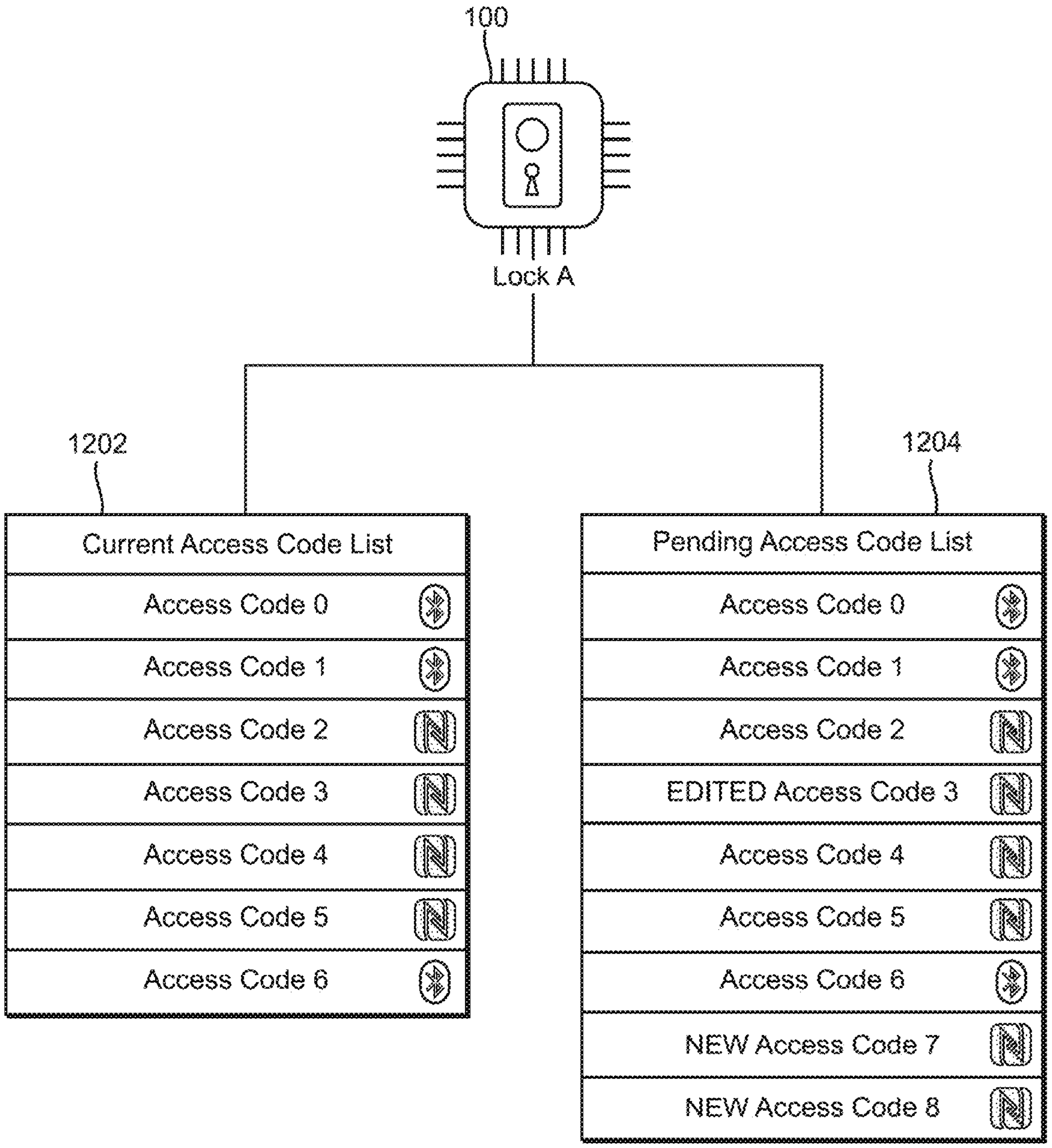
FIG. 12 illustrates an example methodology for updating an access code list at a lock in accordance with the present disclosure.

FIG. 12 illustrates an example methodology for updating an access code list at an electronic lock 100, in accordance with the present disclosure. In general, an electronic lock 100 may store a current access code list 1202 which represents the list of access codes that may be used to actuate lock. Accordingly, the access code list may include access codes from each of a plurality of users (e.g., administrative user 12 and tenant users 18, 19). The server 300 may store the current access code list 1202 for each electronic lock 100 (i.e., the access code list currently stored at the electronic lock) and also a pending access code list 1204, representative of any changes in the access codes since the last time the access code list at the electronic lock was synchronized using a communication sequence with a mobile device (e.g., mobile devices 200, 400).

When any particular user connects to the electronic lock 100 via a mobile device (e.g., mobile devices 200, 400), as part of the communication sequence, the mobile device may retrieve from a cloud account (e.g. the lock cloud account or an associated third-party cloud account) a pending access code list that includes any updates that might be required to the access code list. This may include, for example, any changes to the user or other users' rights at the particular electronic lock 100. Once the mobile device has established secure communication with the electronic lock and has been recognized as a trusted mobile device (e.g., having provided an access code within the current access code list), the mobile device may provide the pending access code list to the electronic lock 100.

Once the pending access code list 1204 is provided to the electronic lock 100, the electronic lock may validate the pending access code list and replace the current access code list 1202 with the pending access code list 1204. For validation, prior to replacement of a current access code list with a pending access code list, an electronic lock may verify that the access code list page was signed appropriately using the correct certificate and therefore ensure that the access code list is authorized by the server 300. Accordingly, at each electronic lock included within a multifamily setting, any user device may, if it has sufficient access privileges to the electronic lock 100, provide updates to the access code list regardless of whether those access codes which are added, edited, or removed are associated with that same user. Of course, the rights to change access codes within the access code list may be limited, in some embodiments, by the role of the particular user whose mobile device (e.g., mobile device 200, 400) is in communication with the electronic lock 100.

Figure 13:
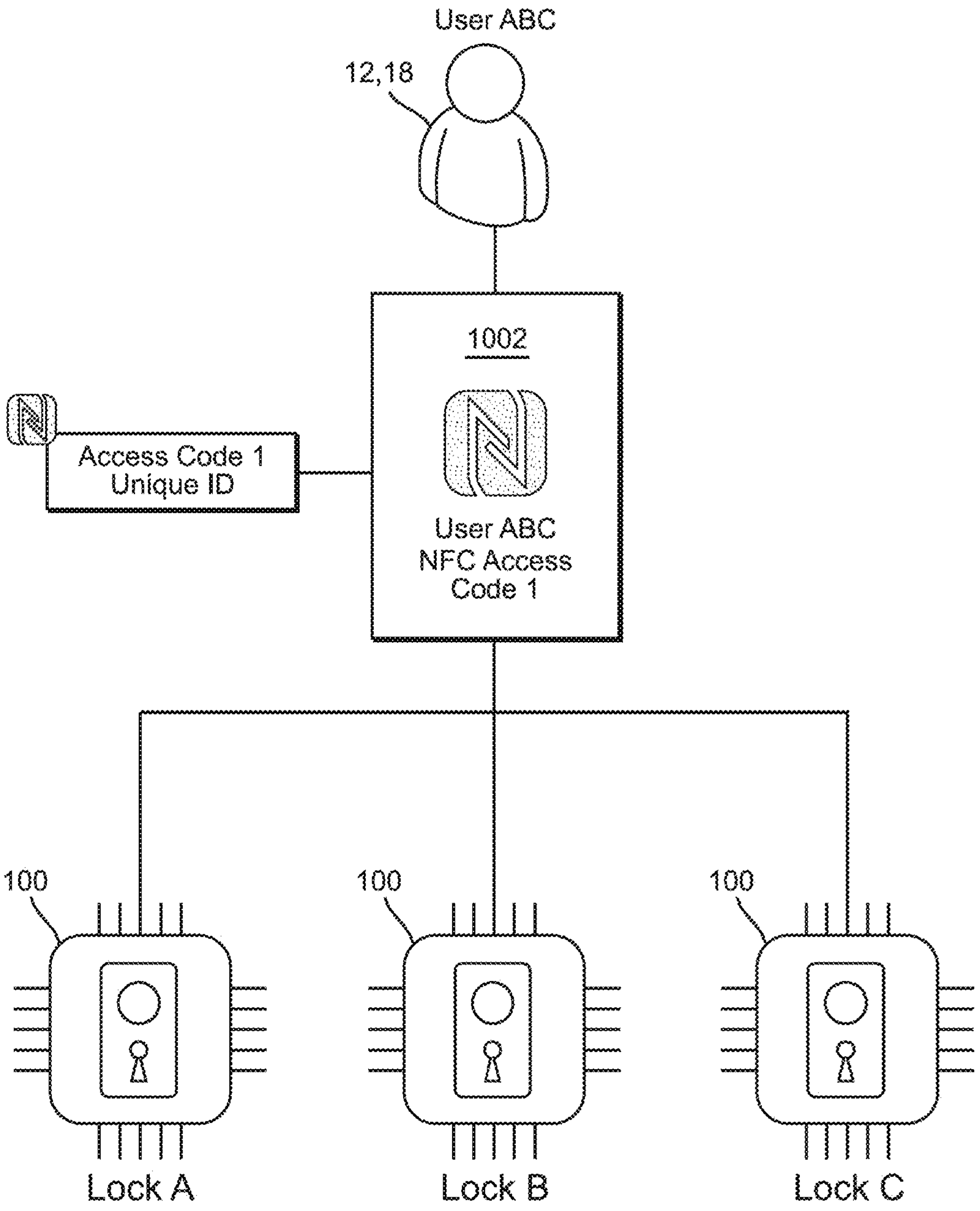
FIG. 13 illustrates an arrangement of an NFC access code usable with each of a series of locks in a multifamily environment in accordance with example aspects of the present disclosure.

FIG. 13 illustrates an arrangement of an NFC access code 1002 usable with each of a series of locks in a multifamily environment in accordance with example aspects of the present disclosure. In the example arrangement shown, a single NFC-based access code may be used to actuate any of a set of defined electronic locks 100. The NFC-based access code may be encoded on a secure card or within a mobile device. This may be in contrast to some embodiments where separate access codes are required for each electronic lock for a single user when Bluetooth based communication is used.

Although not shown, a similar arrangement is provided for purposes of Bluetooth-based access codes. Accordingly, all access codes are directly associated with and reside under a single unique user within an account managed at the server 300 a single user account may have multiple access codes, but those access codes are unique to that user.

It is noted that in the access code updating arrangement as described herein, removing an access code from a lock does not remove the access code from other locks. The access code will only be removed from the lock itself, and the association to the lock for that access code will be removed in an account associated with the user at server 300.

Figure 14:
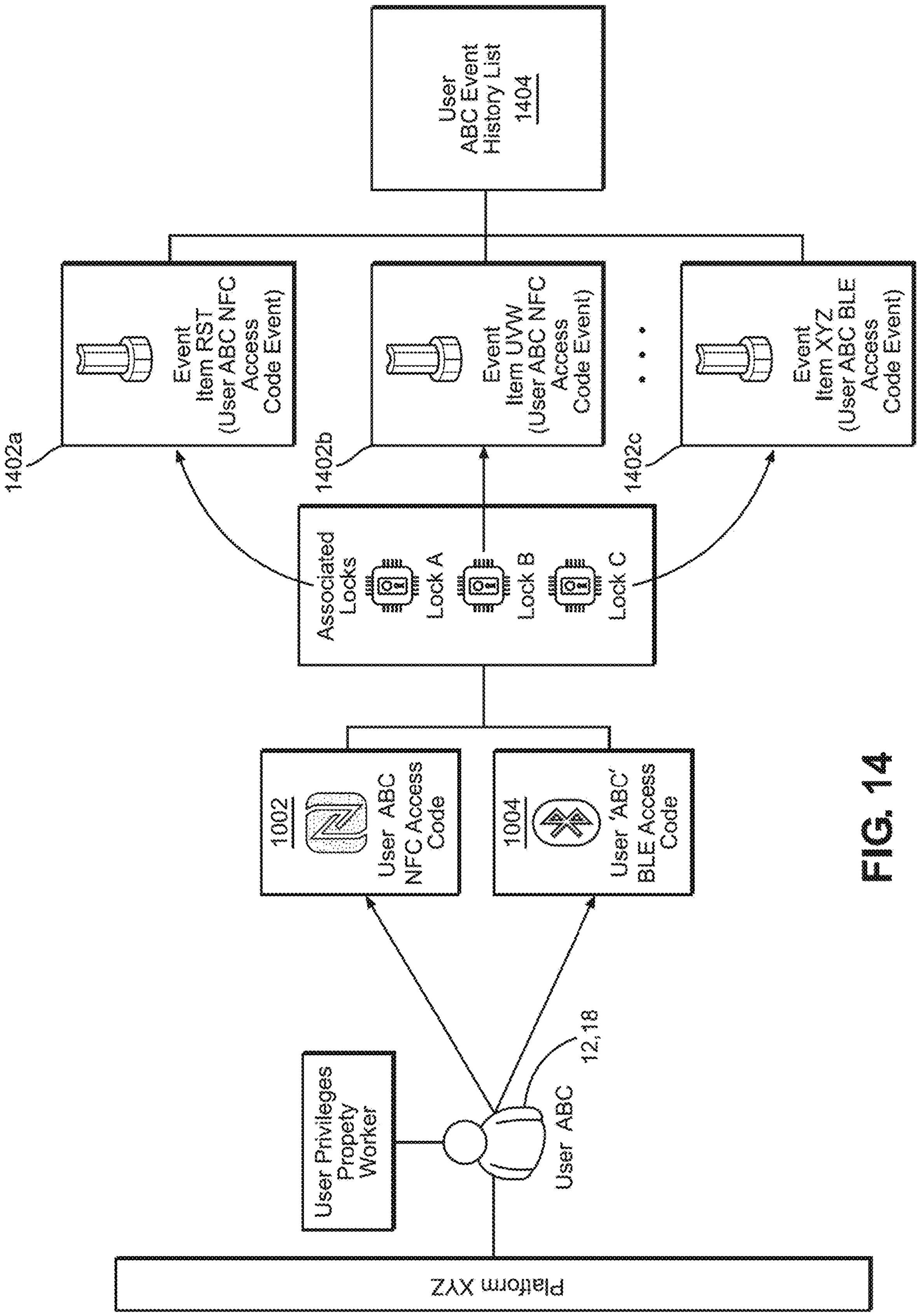
FIG. 14 illustrates an overall architecture for managing events that may occur within a multifamily environment using various types of access codes for a given user, in accordance with an example aspect of the present disclosure.

FIG. 14 illustrates an overall architecture for managing events that may occur within a multifamily environment using various types of access codes for a given user, in accordance with an example aspect of the present disclosure. The event management illustrated in FIG. 14 reflects a method by which an overall set of activity specific to a user may be aggregated and viewed. For example a single user, such as an administrative user 12 or tenant user 18 may use one or both of NFC and/or Bluetooth access codes to access any of a number of electronic locks with which that user is associated. Each of the electronic locks will store separate event histories 1402*a-c*, for access events at each of a plurality of electronic locks. Because each access code has a unique identifier, event histories may be retrieved and uploaded to the server 300 at the time any user communicates with the electronic lock (e.g., at the same time of update of the access code list) and at the server, and an overall user event history list 1404 may be generated. Similarly, changes in settings at the electronic lock may be propagated to the electronic lock by any of mobile devices 200, 400.

Figure 15:
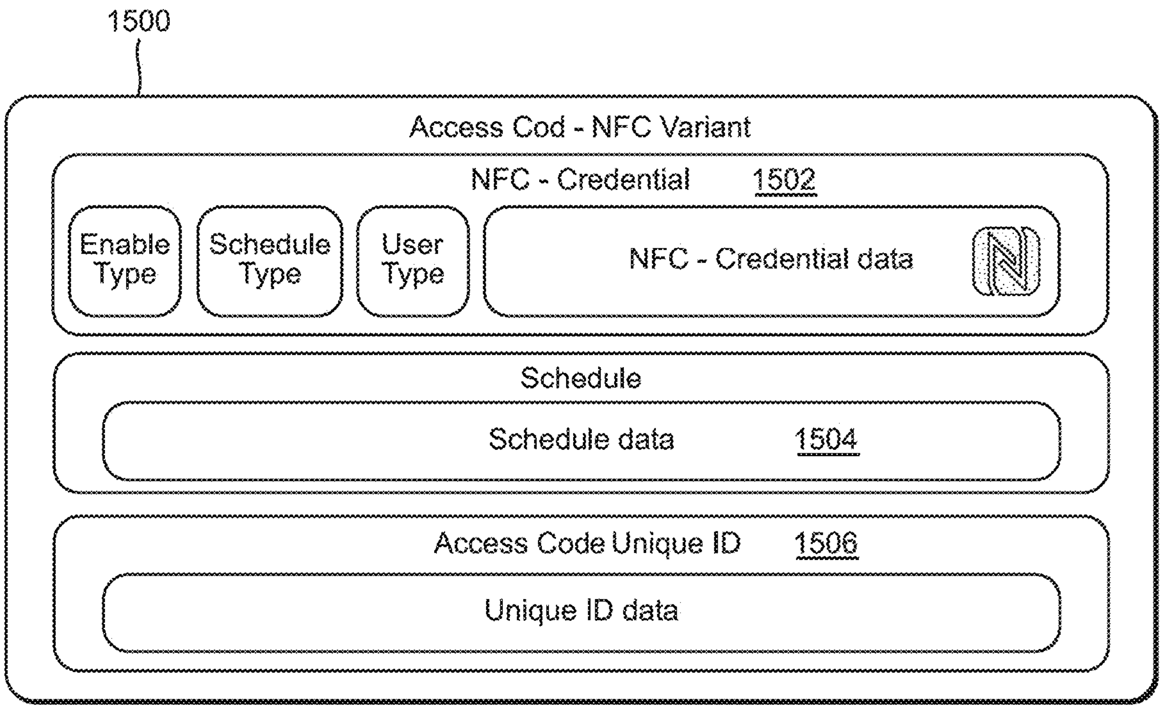
FIG. 15 is a schematic representation of an example access code used for NFC-based lock actuation, in example aspects.
Figure 16:
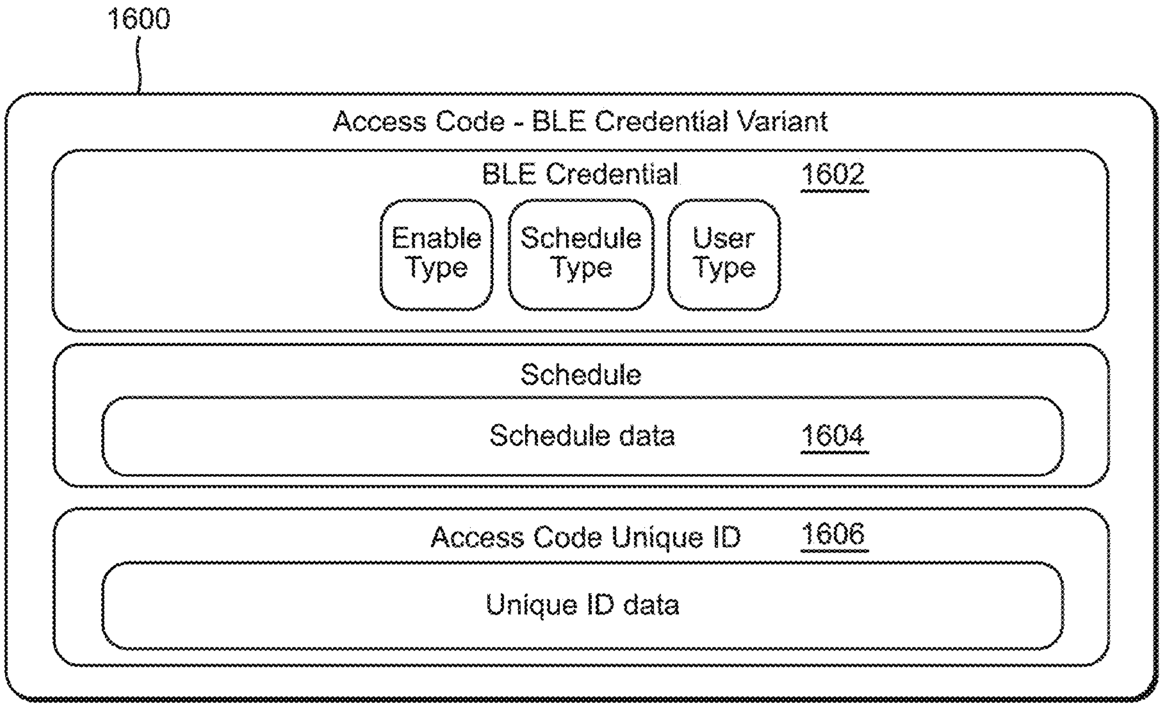
FIG. 16 is a schematic representation of an example access code used for Bluetooth-based lock actuation, in example aspects.

Referring now to FIGS. 15 and 16, specific access code structures are illustrated which may be stored at the server 300, mobile devices 200, 400, as well as at electronic locks 100 (e.g., within an access code list, or indexed to such an access code list).

FIG. 15 is a schematic representation of an example NFC access code 1500 used for NFC-based lock actuation, in example aspects. In the example shown, the NFC access code 1500 includes an NFC credential 1502, schedule information 1504, and a unique identifier 1506.

The NFC credential 1502 includes an enable state variable, a schedule type variable, a user type variable, and NFC credential data. The enable state defines whether the credential is enabled for use at a particular lock, or within the overall multifamily management system. The schedule type reflects whether the user is limited to access on a particular schedule defined in the schedule information 1504. The user type represents the specific class of user as defined above in conjunction with FIG. 9. The NFC credential data represents the NFC code that may be exchanged for validation of the NFC credential at the electronic lock.

The schedule information 1504 includes schedule data which define dates and times (e.g., times of day or days of the week) in which a user is either allowed or disallowed from actuation of one or all electronic locks. Additionally, the unique identifier 1506 is used as part of the access code list and for association of the particular access code with the user at the server 300.

FIG. 16 is a schematic representation of an example BLE access code 1600 used for Bluetooth-based lock actuation, in example aspects. The BLE access code 1600 is generally similar in type to the NFC access code 1500. However, the BLE access code 1600 includes a BLE credential 1602 rather than the NFC credential 1502. The BLE credential similarly includes an enable state variable, a schedule type of variable, and a user type variable, however, the BLE credential 1602 does not include common credential data. This is because the BLE access code is unique for every mobile device to electronic lock pairing, and therefore is managed at the respective electronic locks and mobile devices. For a new user to establish a new BLE access code 1600, that user must perform a mutual authentication process as mentioned above and described in U.S. Provisional Patent Application No. 63/175,360, entitled "Establishment of Secure Bluetooth Connection to Internet of Things Devices, such as Electronic Locks", the disclosure of which was previously incorporated by reference in its entirety. As above, the BLE access code 1600 can include a schedule 1604 and an access code identifier 1606.

IV. Cloud Account Coexistence

Figure 17:
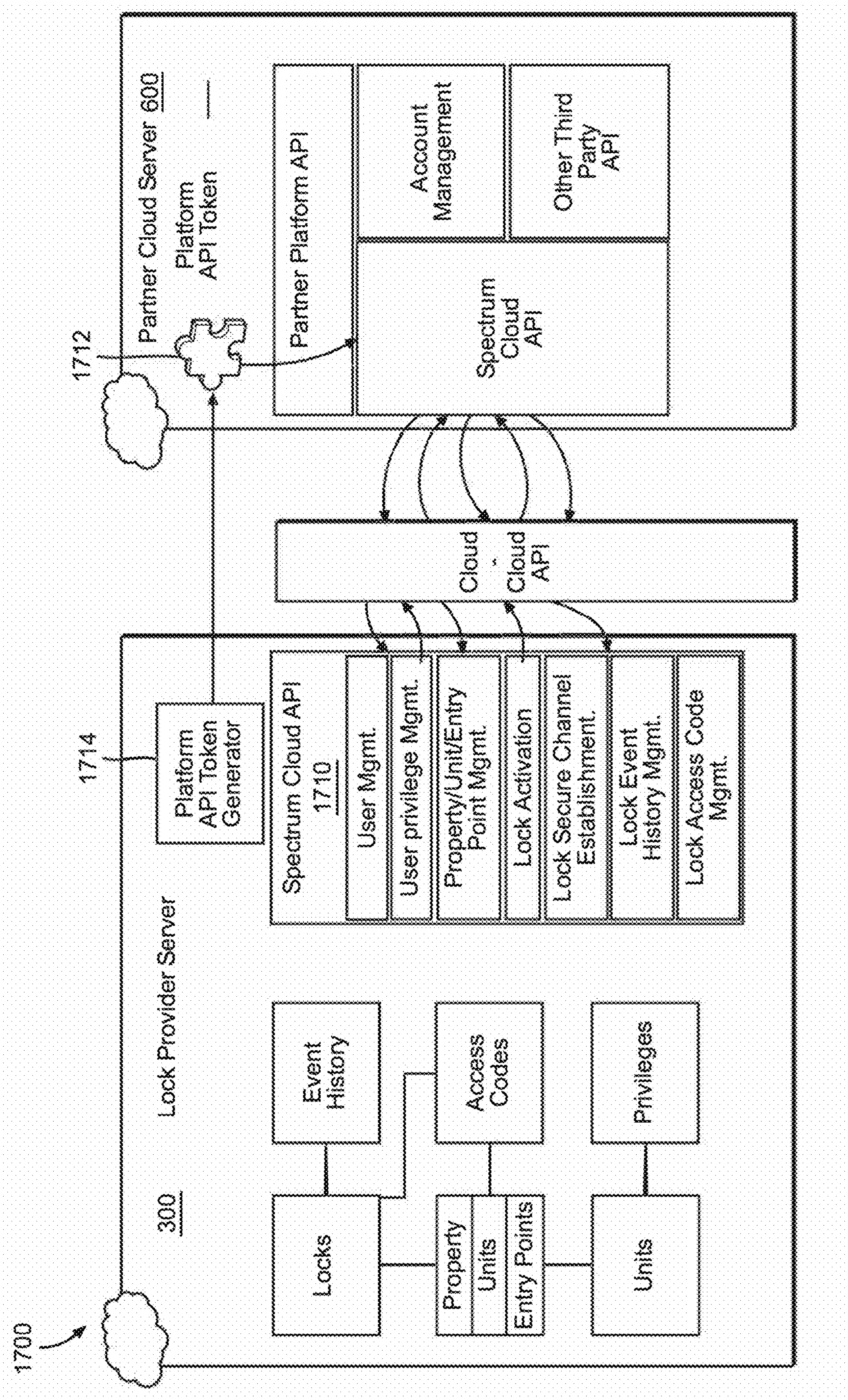
FIG. 17 is a schematic representation of integration between a cloud account provided by a lock provider and a partner cloud account usable for account management and integration with other Internet of Things technologies.
Figure 18:
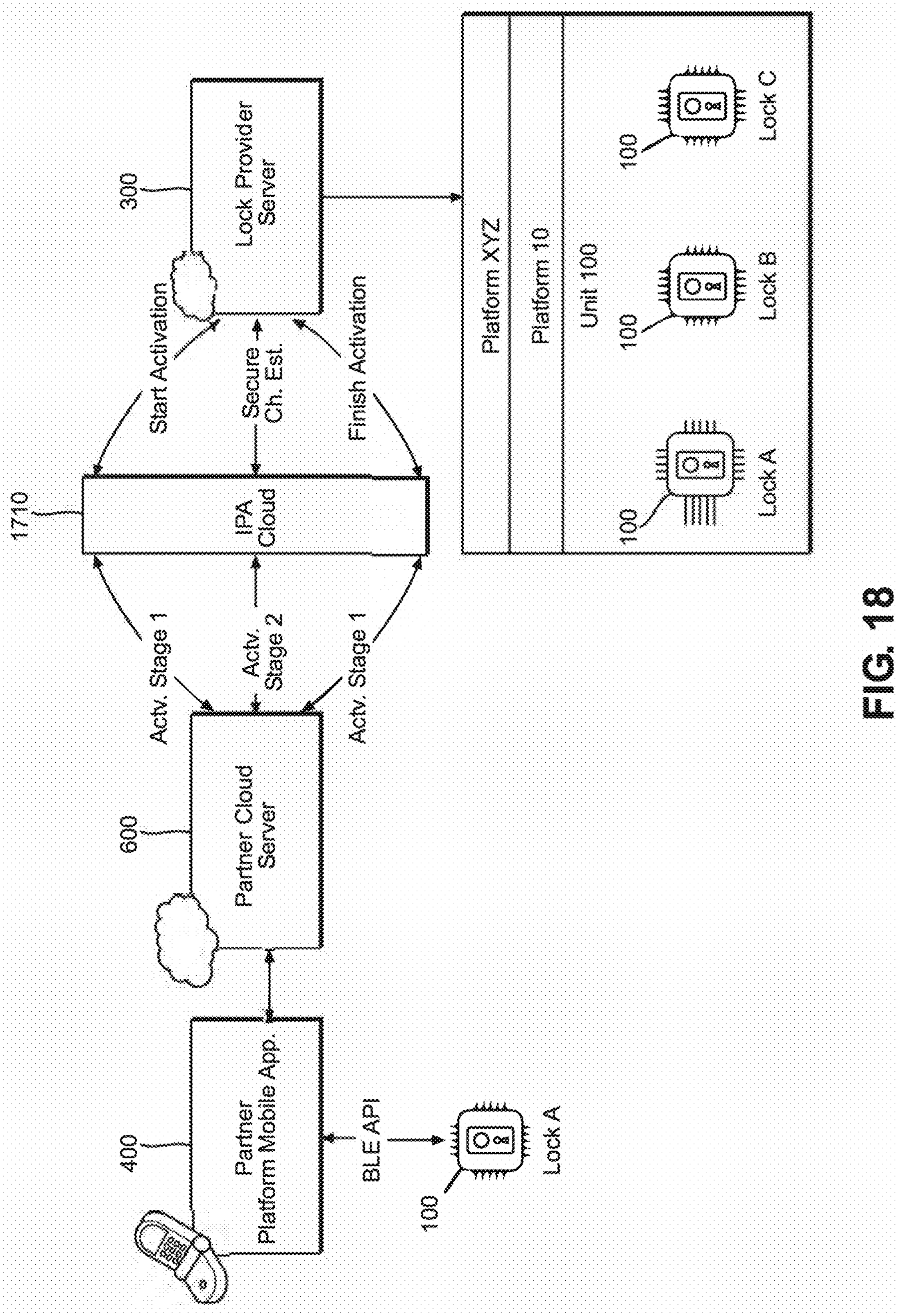
FIG. 18 is a further schematic representation showing integration between a cloud account provided by lock provider, a lock, and a partner cloud account in which a partner mobile application may be used to actuate the electronic lock, in accordance with example aspects of the present disclosure.
Figure 19:
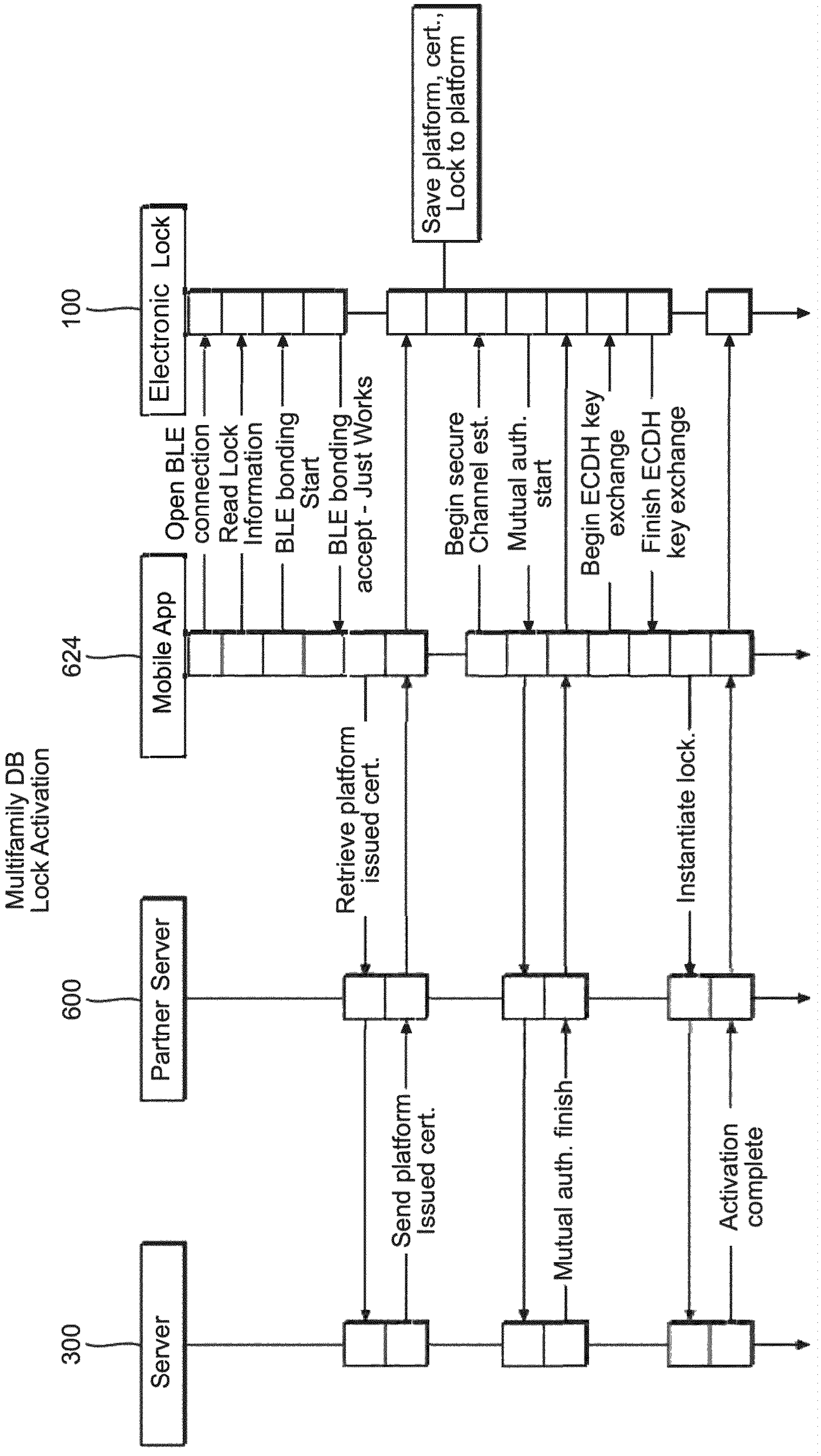
FIG. 19 is an example message flow diagram illustrating activation of a user account and association between a user's mobile device, an electronic lock, and a user cloud account, in accordance with example aspects of the present disclosure.

Referring now to FIGS. 17 through 19, additional details regarding coexistence between a cloud server account (e.g., hosting server 300) and a third-party partner account that may be used to host a mobile application that is capable of communication with electronic locks 100 are provided. Such an arrangement may be advantageous in a multifamily setting, where a third-party application may be developed and owned or controlled by a property management company or may be integrated into a larger Internet of Things or home automation platform for a multifamily facility.

FIG. 17 is a schematic representation of integration between a cloud account provided by a lock provider (e.g., a cloud account at server 300) and a partner cloud account (e.g., a cloud account at server 600) usable for account management and integration with other Internet of Things technologies. In an arrangement 1700 as illustrated, the lock provider cloud server 300 may be communicatively connected with a partner cloud server 600 via a cloud API 1710. The cloud API 1710 may define an API at which the partner cloud server 600 may access data from the lock provider cloud server 300, for example for purposes of user management, user privilege management, property or unit management, lock activation, lock secure channel establishment, or viewing lock event histories or lock access codes. Generally, the lock provider cloud server 300 will provide a token 1712 to the partner cloud server 600 via a token generator 1714. The token may be used to validate and allow usage of the cloud API 1710 by the partner cloud server 600. The lock provider cloud server 300 will maintain the master collection of locks, as well as the relationship between those locks, users (including user privilege definitions), and specific properties which include units and entry points. The lock provider server 300 will also maintain a list of access codes, as well as relationships between those access codes and the specific units and locks. The lock provider server 300 will also aggregate event histories from the locks so that event histories for particular locks, particular users, particular properties, or units may be aggregated and viewed by, e.g., an administrative user 12, or accessible via the cloud API 1710.

FIG. 18 is a further schematic representation showing integration between a lock provider cloud account provided by lock provider, a lock, and a partner cloud account in which a partner mobile application may be used to actuate the electronic lock, in accordance with example aspects of the present disclosure. The integration between the lock provider server 300 and partner cloud server 600 is also performed using the cloud API 1710, and includes initial activation of one or more locks, and establishing a secure channel between a mobile device and lock via exchange of certificate information from the lock provider server 300. Details regarding establishing the secure channel are, again, in U.S. Provisional Patent Application No. 63/175,360, entitled "Establishment of Secure Bluetooth Connection to Internet of Things Devices, such as Electronic Locks", the disclosure of which was previously incorporated by reference in its entirety. In general, the partner cloud server 600 acts as a pass-through of information between the lock provider server 300, the particular electronic lock being activated or communicated with, and the selected mobile application of a mobile device (e.g., mobile device 200, 400).

As seen in FIG. 19, an example message sequence is depicted among various cloud accounts, a mobile application, and electronic lock is depicted which enables secure connection between the mobile application and lock. In the example shown, the mobile application may execute on a mobile device (e.g., mobile device 400) communicate with its hosting partner cloud server 600 which acts as a pass through to the lock provider server 300. In general, the mobile application will establish a BLE connection with an electronic lock, and upon establishing the connection will retrieve a platform certificate from the lock provider server 300. The mobile application will provide the platform certificate to the electronic lock, which saves the platform certificate. A secure channel establishment process is performed in conjunction with mutual authentication among the electronic lock 100, electronic lock application 624 (at mobile device 200, 400), and both the partner cloud server 600 and lock provider server 300.

Upon completion of the mutual authentication process, a key exchange process is performed, and a lock instantiation message is sent from the electronic lock application 624 to the lock provider server 300. The lock provider server 300 will then pass a completion message through the partner cloud server 600 back to the electronic lock application which transmits that completion message to the electronic lock 100 via the Bluetooth connection. Accordingly, secure credentials are established between the mobile application and electronic lock, and the electronic lock is activated within the lock provider server 300.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An electronic lock comprising:

a latch assembly including a bolt movable between a locked position and an unlocked position;

a motor configured to receive actuation commands causing the motor to move the bolt from the locked position to the unlocked position or from the unlocked position to the locked position;

a wireless circuit configured to communicate wirelessly with an application installed on a mobile device;

at least one processor;

a memory communicatively connected to the processor, the memory storing instructions which, when executed, cause the electronic lock to:

establish a wireless communication connection with the mobile device executing the mobile application, the mobile device being associated with a user;

receive a pending access code list via the wireless communication connection from the mobile application, the pending access code list including a plurality of access code entries and a hash of the plurality of access code entries, the plurality of access code entries being associated with a plurality of users;

determine whether the pending access code list is signed by a server associated with the mobile application, wherein a signature by the server indicates that the pending access code list is authorized by the server; and based, at least in part, on whether the pending access code list is signed by the server, adopt the pending access code list as a current access code list in the memory by replacing a previous access code list with the pending access code list; wherein the instructions further cause the electronic lock to compute a second hash of the plurality of access code entries in the pending access code list, and compare the second hash to the hash appended to the pending access code list to detect tampering with the pending access code list.

2. The electronic lock of claim 1, wherein the instructions further cause the electronic lock to:

establish a second wireless communication connection with a second mobile device executing a second mobile application, the second mobile device being associated with a second user;

receive an updated access code list via the second wireless communication connection from the second mobile application;

determine whether the updated access code list is signed by the server, the server being further associated with the second mobile application; and based, at least in part, on whether the updated access code list is signed by the server, adopt the updated access code list as the current access code list in the memory.

3. The electronic lock of claim 1, wherein the memory stores a plurality of access codes including an NFC access code for a user that is shared across a plurality of electronic locks to which the user has access and a Bluetooth access code for the user that is unique across the plurality of electronic locks to which the user has access.

4. The electronic lock of claim 1, wherein a partner server acts a pass-through of information between the server and the electronic lock.

5. The electronic lock of claim 1, wherein to initially establish the wireless communication connection with the mobile device to activate the electronic lock includes to:

receive a pairing passcode of the electronic lock;

initiate a wireless pairing mode to pair with the mobile device, the mobile device being proximate to the electronic lock; and pair with the mobile device to establishing the wireless communication connection.

6. An electronic lock access management system comprising:

an electronic lock having a lock memory and a wireless communication interface; and a server system comprising one or more server computing devices, the server system being communicatively connected to the electronic lock via the wireless communication interface and including a memory storing a database including a plurality of user accounts, each user account being associated with a set of privileges and one or more properties, each property being associated with one or more locks, each of the one or more locks being associated with one or more access codes that are specific to each user;

wherein the electronic lock stores, in the lock memory, an encrypted copy of an access code list received from the server system by replacing a previous access code list with the encrypted copy of the access code list received from the server system, the encrypted copy of the access code list including a set of access codes that are associated with the electronic lock in the database and a hash of the set of access codes, wherein the encrypted copy of the access code list is signed by the server system, the signing by the server system indicating that the encrypted copy of the access code list is authorized by the server, wherein storing of the encrypted copy of the access code list by the electronic lock is based, at least in part, on the encrypted copy of the access code list being signed by the server system, and wherein the electronic lock computes a second hash of the set of access codes in the encrypted copy of the access code list, and compares the second hash to the hash appended to the encrypted copy of the access code list to detect tampering with the encrypted copy of the access code list.

7. The electronic lock access management system of claim 6, further comprising a mobile application executable on a mobile device of a user.

8. The electronic lock access management system of claim 7, wherein the mobile application is provided by a third-party application provider having an application server, the application server being communicatively connected to the server system via an Application Programming Interface (API) provided by the server system.

9. The electronic lock access management system of claim 7, wherein the electronic lock is configured to receive the access code list from the server system via the mobile device.

10. The electronic lock access management system of claim 9, wherein the access code list includes access codes authorized for use by a plurality of different users at the electronic lock.

11. The electronic lock access management system of claim 6, further comprising a wireless bridge communicatively connected between the server system and the electronic lock, wherein the wireless bridge includes:

a first wireless interface configured to communicate with the electronic lock using a first wireless protocol; and a second wireless interface configured to communicate with the server system using a second wireless protocol different from the first wireless protocol.

12. The electronic lock access management system of claim 6, further comprising a plurality of electronic locks, each of the plurality of electronic locks having a different set of access codes associated therewith.

13. A method for assigning access to a plurality of locks, the method comprising:

receiving, at a server, an access code list for an electronic lock, the access code list including a plurality of access code entries and a hash of the plurality of access code entries, the plurality of access code entries being associated with a plurality of users;

signing, at the server, the access code list with a unique digital certificate, wherein the signing by the server indicates that the access code list is authorized by the server; and sending the signed access code list to a mobile device, wherein the mobile device is in wireless communication with the electronic lock and provides the signed access code list to the electronic lock and the electronic lock verifies the signed access code list by validating the unique digital certificate and adopts the signed access code list by replacing a previous access code list with the signed access code list, wherein adoption of the signed access code list by the electronic lock is based, at least in part, on the signed access code list being signed by the server, wherein the electronic lock computes a second hash of the plurality of access code entries in the signed access code list, and compares the second hash to the hash appended to the signed access code list to detect tampering with the signed access code list.

14. The method of claim 13, the method further comprising:

generating and sending a link to a second mobile device associated with one user of the plurality of users, wherein the link, when selected at the second mobile device, installs an electronic lock application, prompts the one user to create an account with the electronic lock application, and associates the account with the access code of the one user.

15. The method of claim 13, the method further comprising:

storing the plurality of access code entries in a database on a per-user basis, wherein the plurality of access code entries is provided to an authorized user to adjust access rights for a particular user of the plurality of users.

16. The method of claim 13, the method further comprising:

receiving updates to the access code list and storing the updates as a pending access code list; and in response to an authorized mobile device wirelessly connecting to the electronic lock, sending, via the authorized mobile device, the pending access code list to the electronic lock to update the access code list at the electronic lock.

17. The method of claim 16, wherein the electronic lock verifies the pending access code list is authorized by the server, such that any user device with sufficient access privileges to the electronic lock can provide the pending access code list to the electronic lock.

18. The method of claim 13, wherein the access code list includes Bluetooth and NFC-based access codes.

19. The method of claim 13, the method further comprising:

integrating with a third party server to establish communication with a mobile device associated with one of the plurality of users.

* * * * *